US009870537B2

(12) United States Patent
Vasseur et al.

(10) Patent No.: US 9,870,537 B2
(45) Date of Patent: Jan. 16, 2018

(54) DISTRIBUTED LEARNING IN A COMPUTER NETWORK

(71) Applicant: Cisco Technology, Inc., San Jose, CA (US)

(72) Inventors: Jean-Philippe Vasseur, Saint Martin d'Uriage (FR); Javier Cruz Mota, Assens (CH); Andrea Di Pietro, Lausanne (CH)

(73) Assignee: Cisco Technology, Inc., San Jose, CA (US)

( * ) Notice: Subject to any disclaimer, the term of this patent is extended or adjusted under 35 U.S.C. 154(b) by 699 days.

(21) Appl. No.: 14/164,446

(22) Filed: Jan. 27, 2014

(65) Prior Publication Data
US 2015/0193694 A1 Jul. 9, 2015

Related U.S. Application Data

(60) Provisional application No. 61/923,847, filed on Jan. 6, 2014.

(51) Int. Cl.
*H04L 29/06* (2006.01)
*G06N 99/00* (2010.01)
(Continued)

(52) U.S. Cl.
CPC ......... *G06N 99/005* (2013.01); *G06N 3/0454* (2013.01); *G06N 3/08* (2013.01);
(Continued)

(58) Field of Classification Search
None
See application file for complete search history.

(56) References Cited

U.S. PATENT DOCUMENTS 7,181,768 B1 * 2/2007 Ghosh ................ G06F 21/552
706/25
7,424,619 B1 * 9/2008 Fan .................... G06F 21/552
713/188
(Continued)

FOREIGN PATENT DOCUMENTS

EP 2442525 A1 4/2012
WO WO-02/48959 A2 6/2002

OTHER PUBLICATIONS

Cai, et al., "Distributed Aggregation Algorithms with Load-Balancing for Scalable Grid Resource Monitoring", Parallel and Distributed Processing Symposium, Mar. 2007, 10 pages, Institute of Electical and Electronics Engineers.
(Continued)

*Primary Examiner* — Jason C Chiang
(74) *Attorney, Agent, or Firm* — Parker Ibrahim & Berg LLC; James M. Behmke; Stephen D. LeBarron

(57) ABSTRACT

In one embodiment, a first data set is received by a network device that is indicative of the statuses of a plurality of network devices when a type of network attack is not present. A second data set is also received that is indicative of the statuses of the plurality of network devices when the type of network attack is present. At least one of the plurality simulates the type of network attack by operating as an attacking node. A machine learning model is trained using the first and second data set to identify the type of network attack. A real network attack is then identified using the trained machine learning model.

17 Claims, 39 Drawing Sheets

(51) Int. Cl.
  *G06N 3/08* (2006.01)
  *H04L 12/26* (2006.01)
  *H04L 12/24* (2006.01)
  *G06N 3/04* (2006.01)

(52) U.S. Cl.
  CPC ........... *G06N 3/084* (2013.01); *H04L 41/142* (2013.01); *H04L 41/16* (2013.01); *H04L 43/10* (2013.01); *H04L 63/14* (2013.01); *H04L 63/1408* (2013.01); *H04L 63/1416* (2013.01)

(56) References Cited

U.S. PATENT DOCUMENTS

| | | | |
|---|---|---|---|
| 7,526,806 B2 | 4/2009 | Wiley et al. | |
| 7,603,709 B2 | 10/2009 | Lewis et al. | |
| 7,657,940 B2 | 2/2010 | Portolani et al. | |
| 7,675,926 B2 | 3/2010 | Olsen et al. | |
| 7,694,335 B1 | 4/2010 | Turner et al. | |
| 7,733,798 B2 | 6/2010 | White et al. | |
| 7,779,471 B2 | 8/2010 | Balasubramaniyan et al. | |
| 7,793,138 B2 | 9/2010 | Rastogi et al. | |
| 7,854,000 B2 | 12/2010 | Venkat et al. | |
| 7,971,256 B2 | 6/2011 | Bhikkaji et al. | |
| 8,032,779 B2 | 10/2011 | Clemm et al. | |
| 8,121,024 B1 | 2/2012 | Natarajan et al. | |
| 8,161,554 B2 | 4/2012 | Sadhasivam et al. | |
| 8,230,498 B2 | 7/2012 | Shaffer et al. | |
| 8,261,355 B2 | 9/2012 | Rayes et al. | |
| 8,312,541 B2 | 11/2012 | Levy-Abegnoli et al. | |
| 8,619,576 B2 | 12/2013 | Vasseur et al. | |
| 8,634,316 B2 | 1/2014 | Rosenberg et al. | |
| 8,997,224 B1* | 3/2015 | Lu .................. | H04L 63/1441 726/22 |
| 8,997,227 B1* | 3/2015 | Mhatre ............ | H04L 63/1416 726/23 |
| 2003/0051026 A1* | 3/2003 | Carter .............. | H04L 12/24 709/224 |
| 2005/0037733 A1* | 2/2005 | Coleman .......... | H04B 7/086 455/411 |
| 2007/0239999 A1* | 10/2007 | Honig .............. | G06F 21/554 713/194 |
| 2008/0083029 A1 | 4/2008 | Yeh et al. | |
| 2008/0109730 A1* | 5/2008 | Coffman ........... | G06Q 30/02 715/733 |
| 2008/0148342 A1 | 6/2008 | Aiyagari et al. | |
| 2008/0184371 A1* | 7/2008 | Moskovitch ....... | G06F 21/566 726/24 |
| 2010/0082513 A1 | 4/2010 | Liu | |
| 2011/0004935 A1* | 1/2011 | Moffie .............. | G06F 21/53 726/23 |
| 2011/0258702 A1 | 10/2011 | Olney et al. | |
| 2012/0023572 A1 | 1/2012 | Williams, Jr. et al. | |
| 2012/0026938 A1 | 2/2012 | Pandey et al. | |
| 2012/0155475 A1 | 6/2012 | Vasseur et al. | |
| 2012/0159622 A1* | 6/2012 | Lee .................. | G06F 21/55 726/22 |
| 2012/0230204 A1 | 9/2012 | Vasseur et al. | |
| 2012/0320923 A1 | 12/2012 | Vasseur et al. | |
| 2012/0329426 A1* | 12/2012 | Kario ............... | H04W 12/12 455/410 |
| 2013/0010610 A1 | 1/2013 | Karthikeyan et al. | |
| 2013/0024560 A1 | 1/2013 | Vasseur et al. | |
| 2013/0104230 A1 | 4/2013 | Tang et al. | |
| 2013/0159479 A1 | 6/2013 | Vasseur | |
| 2013/0159548 A1 | 6/2013 | Vasseur et al. | |
| 2013/0179538 A1 | 7/2013 | Dutta et al. | |
| 2013/0219046 A1 | 8/2013 | Wetterwald et al. | |
| 2013/0276114 A1 | 10/2013 | Friedrichs et al. | |
| 2013/0298184 A1 | 11/2013 | Ermagan et al. | |
| 2014/0022906 A1 | 1/2014 | Vasseur et al. | |
| 2014/0025945 A1 | 1/2014 | McGrew et al. | |
| 2014/0113588 A1* | 4/2014 | Chekina ........... | G06F 21/552 455/410 |
| 2015/0172302 A1* | 6/2015 | Conlon ............. | H04L 63/1408 726/23 |

OTHER PUBLICATIONS

Hwang, et al., "DHT-Based Security Infrastructure for Trusted Internet and Grid Computing", International Journal of Critical Infrastructures, vol. 2, No. 4, Nov. 2009, pp. 412-433, Inderscience Publishers.

Jover, R.P., "Security Attacks Against the Availability of LTE Mobility Networks: Overview and Research Directions", 16th International Symposium on Wireless Personal Multimedia Communications (WPMC), Jun. 2013, 9 pages, Atlantic City, NJ.

Lippmann, et al., "Analysis and Results of the 1999 DARPA Off-Line Intrusion Detection Evaluation", Proceedings of the Third International Workshop on Recent Advances in Intrusion Detection, RAID, (2000), pp. 162-182, Springer-Verlag, London, UK.

Oh, et al., "Distributed Learning in Mobile Sensor Networks Using Cross Validation" 49th IEEEE Conference on Decision and Control, Dec. 2010, 6 pages, Institute of Electrical and Electronics Engineers, Atlanta, GA.

Ryan, et al., "Intrusion Detection with Neural Networks", Technical Report WS-97-07, (1997), pp. 72-77, Association for the Advancement of Artificial Intelligence.

Sommer, R., "Outside the Closed World: On Using Machine Learning for Network Intrusion Detection", IEEE Symposium on Security and Privacy, May 2010, pp. 305-316, Intitute of Electrical and Electronics Engineers, Oakland, CA.

Vasseur et al., "Computer Network Anomaly Training and Detection Using Artificial Neural Networks", U.S. Appl. No. 61/923,847, filed Jan. 6, 2014, 166 pgs., U.S. Patent and Trademark Office, Alexandria, Virginia.

Vasseur, et al., "Routing Metrics Used for Path Calculation in Low-Power and Lossy Networks", Request for Comments 6551, Mar. 2012, 30 pages, Internet Engineering Task Force Trust.

Viola, et al. "Rapid Object Detection Using a Boosted Cascade of Simple Features", Proceedings of the 2001 IEEE Computer Vision and Pattern Recognition, vol. 1, (2001), 8 pages, Institute of Electical and Electronics Engineers.

Winter, et al., "RPL: IPv6 Routing Protocol for Low-Power and Lossy Networks", Request for Comments 6550, Mar. 2012, 157 pages, Internet Engineering Task Force Trust.

Zinkevic, et al., "Parallelized Stochastic Gradient Descent", Proceedings of the Advances in Neural Information Processing Systems 23 (2010), 37 pages.

International Search Report dated Mar. 30, 2015 issued in connection with PCT/US2015/010114.

Raghavendra V. Kulkarni et al.: "Neural network based secure media access control protocol for wireless sensor networks", International Joint Conference on Neural Networks, 2009, IEEE, Piscataway, NJ, USA, Jun. 14, 2009, pp. 1680-1687.

Jun Wu et al.: "Toward Intelligent Intrusion Prediction for Wireless Sensor Networks Using Three-Layer Brain-Like Learning", International Journal of Distributed Sensor Networks, vol. 2012, Jan. 1, 2012, pp. 1-14.

Reghavendra V. Kulkarni et al.: "Computational Intelligence in Wireless Sensor Networks: A Survey", IEEE Communications Surveys, IEEE, New York, NY, USA, vol. 13, No. 1, Jan. 1, 2011, pp. 68-96.

\* cited by examiner

DISTRIBUTED LEARNING IN A COMPUTER NETWORK

RELATED APPLICATIONS

This application claims priority to U.S. Provisional Application No. 61/923,847, filed Jan. 6, 2014, entitled: COMPUTER NETWORK ANOMALY TRAINING AND DETECTION USING ARTIFICIAL NEURAL NETWORKS, by Vasseur, et al., the contents of which are herein incorporated by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and performance indicators), and recognize complex patterns in these data. In general, these patterns are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, and association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Learning Machines (LMs) are computational entities that rely on one or more ML techniques for performing a task for which they have not been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
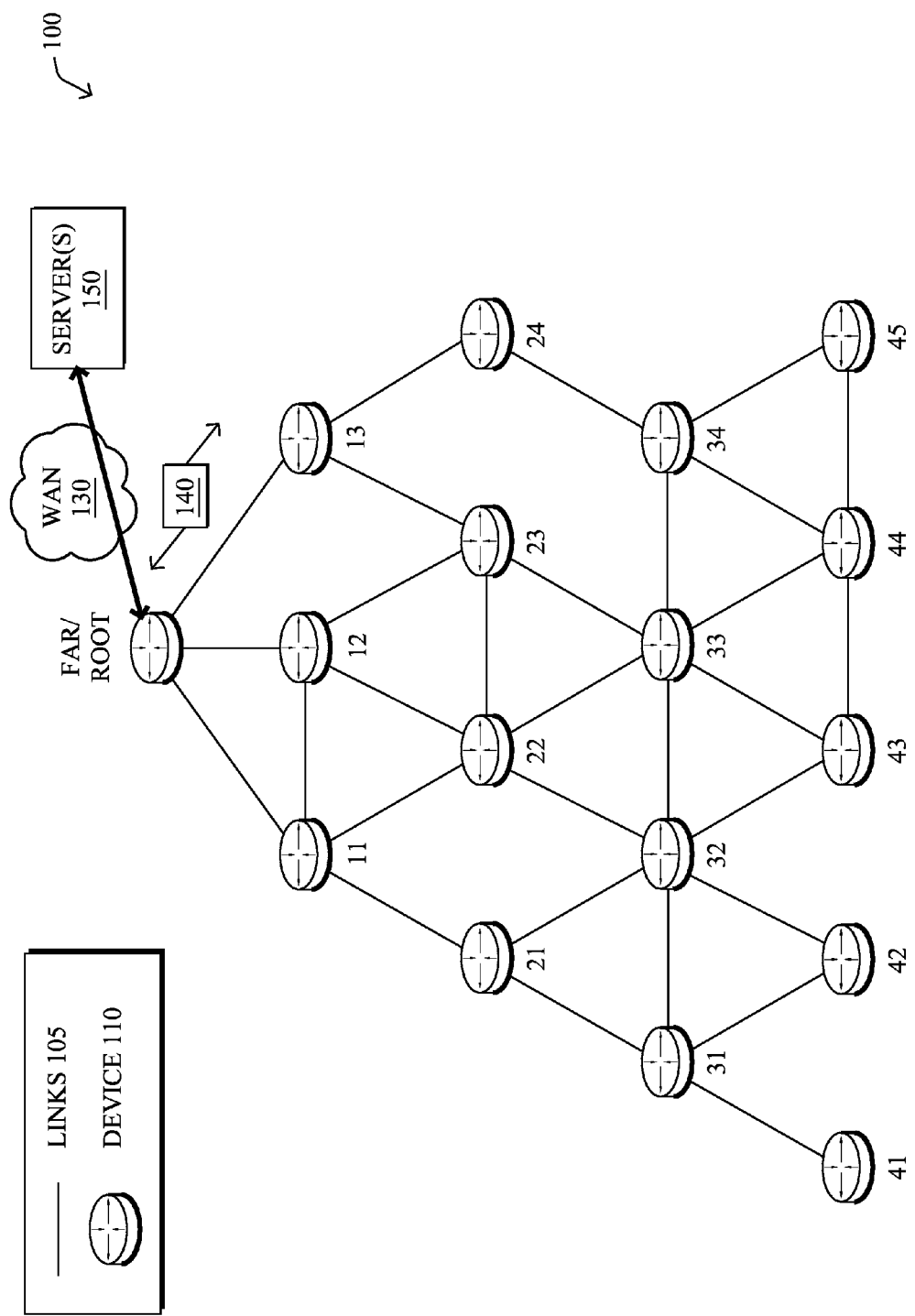
FIG. 1 illustrates an example communication network.

According to one or more embodiments of the disclosure, a first data set is received by a network device that is indicative of the statuses of a plurality of network devices when a type of network attack is not present. A second data set is also received that is indicative of the statuses of the plurality of network devices when the type of network attack is present. At least one of the plurality simulates the type of network attack by operating as an attacking node. A machine learning model is trained using the first and second data set to identify the type of network attack. A real network attack is then identified using the trained machine learning model.

In some embodiments, a request may be received by a network policy engine to begin collecting a first set of status data from a plurality of network devices corresponding to a type of network attack not being present. The collection of the first set of status data is then scheduled. Another request may also be received by the network policy engine to begin collecting a second set of status data from the plurality of network devices corresponding to at least one of the network devices simulating the type of network attack. The collection of the second set of status data is then scheduled. Finally, a notification is received that a machine learning model has been trained using the first and second sets of status data.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications), temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
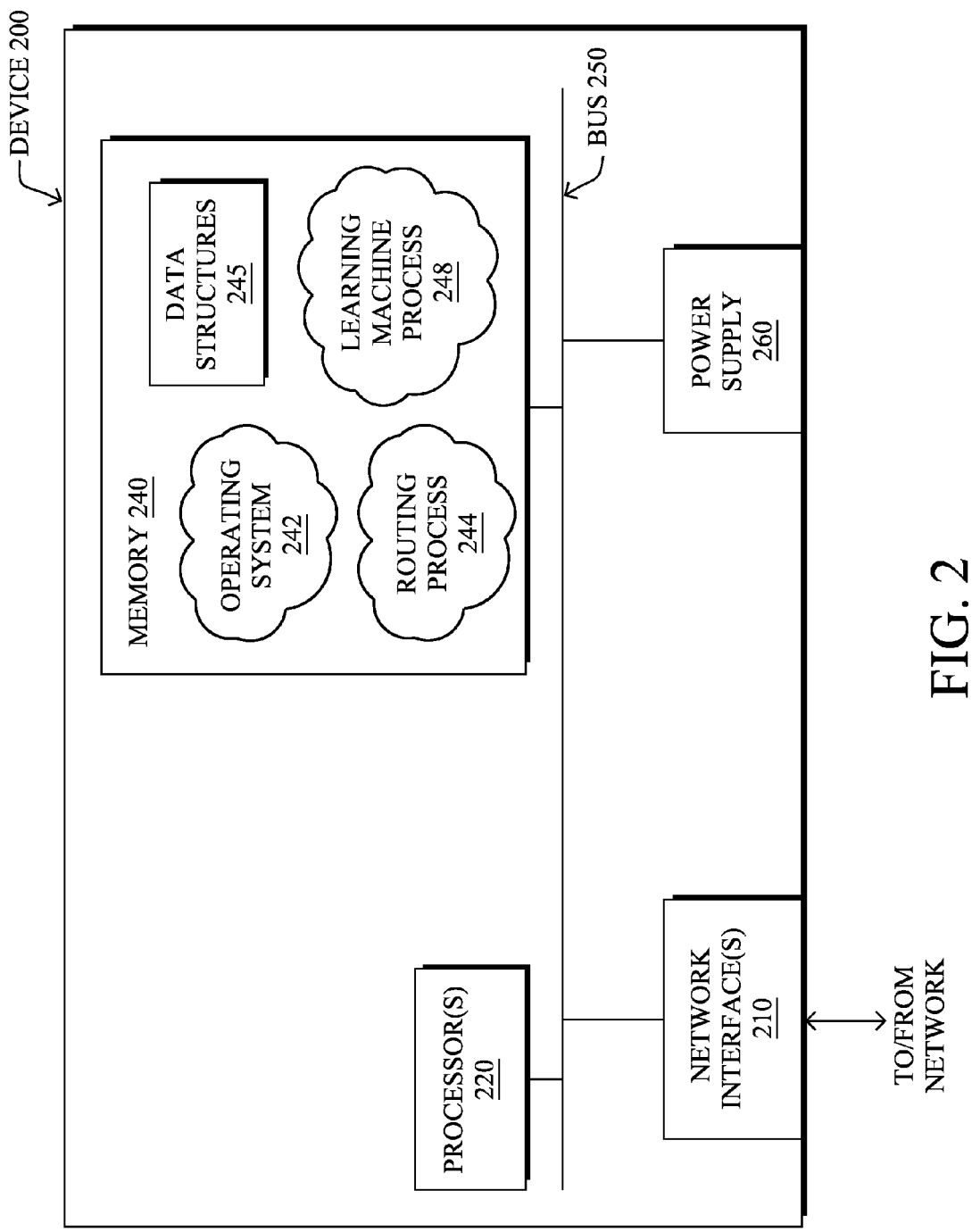
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. Operating systems 242, portions of which are typically resident in memory 240 and executed by the processor, functionally organizes the device by, inter alia, invoking operations in support of software processes and/or services executing on the device. These software processes and/or services may comprise routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols, as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnects are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward, and terminating at, one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
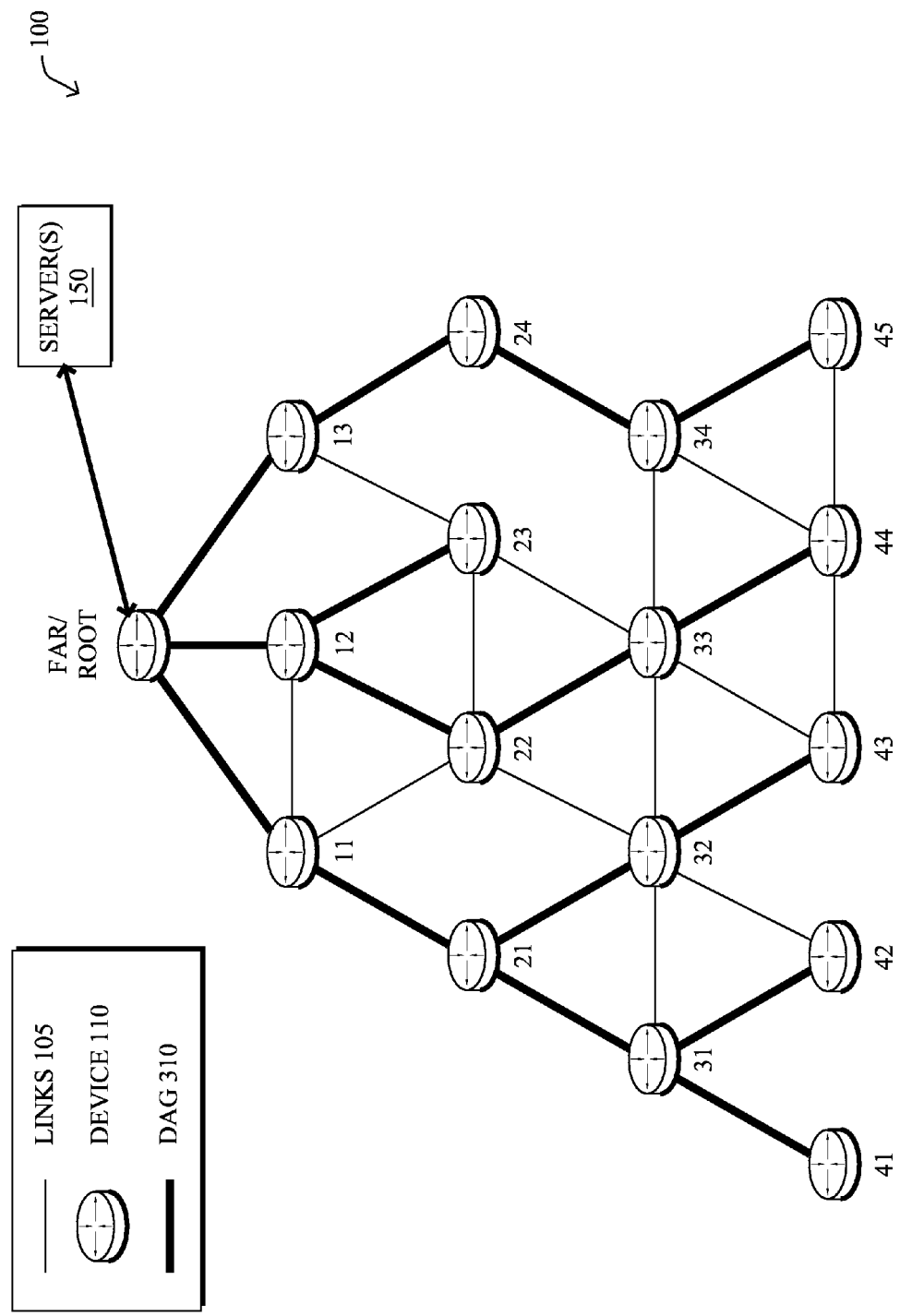
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

RPL supports two modes of operation for maintaining and using Downward routes:

1) Storing Mode: RPL routers unicast DAO messages directly to their DAG Parents. In turn, RPL routers maintain reachable IPv6 addresses for each of their DAG Children in their routing table. Because intermediate RPL routers store Downward routing state, this mode is called Storing mode.

2) Non-Storing Mode: RPL routers unicast DAO messages directly to the DAG Root. The DAO message also includes the IPv6 addresses for the source's DAG Parents. By receiving DAO messages from each RPL router in the network, the DAG Root obtains information about the DAG topology and can use source routing to deliver datagrams. Unlike Storing mode, intermediate RPL routers in Non-Storing mode do not maintain any Downward routes.

Learning Machine Technique(s)

As noted above, machine learning (ML) is concerned with the design and the development of algorithms that take as input empirical data (such as network statistics and performance indicators), and recognize complex patterns in these data. One very common pattern among ML algorithms is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely on one or more ML algorithms for performing a task for which they have not been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficient management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

Artificial Neural Networks (ANNs) are a type of machine learning technique whose underlying mathematical models were inspired by the hypothesis that mental activity consists primarily of electrochemical activity between interconnected neurons. ANNs are sets of computational units (neurons) connected by directed weighted links. By combining the operations performed by neurons and the weights applied by their links, ANNs are able to perform highly non-linear operations on their input data.

The interesting aspect of ANNs, though, is not that they can produce highly non-linear outputs of the input. The truly interesting aspect is that ANNs can "learn" to reproduce a predefined behavior through a training process. This capacity of learning has allow the successful application of ANNs to a wide variety of learning problems, such as medical diagnostics, character recognition, data compression, object tracking, autonomous driving of vehicles, biometrics, etc.

Learning in ANNs is treated as an optimization problem where the weights of the links are optimized for minimizing a predefined cost function. This optimization problem is computationally very expensive, due to the high number of parameters to be optimized, but thanks to the backpropagation algorithm, the optimization problem can be performed very efficiently. Indeed, the backpropagation algorithm computes the gradient of the cost function with respect to the weights of the links in only one forward and backward pass throw the ANN. With this gradient, the weights of the ANN that minimize the cost function can be computed.

Denial of service (DoS) is a broad term for any kind of attack aiming at, by any means, making a particular service unavailable (be it a certain application running on a server or network connectivity itself). This is usually performed by bringing the target's resources to exhaustion (again, target resources may range from bandwidth to memory and CPU).

In greater detail, a DoS attack may consist in flooding a target network with hundreds of megabits of traffic (volume based DoS), exhausting a server state by opening a large number of TCP connections (SYN flooding), or by making an HTTP server unavailable by sending it an overwhelming number of requests. An attack may be more subtle and exploit well-known vulnerabilities in the target system (e.g. a large number of fragmented IP packets may exhaust the resources of a router).

Nowadays, DoS attacks are mostly distributed, i.e., they are carried out by multiple sources at the same time, thus making it more difficult to track. In many cases, botnets (i.e. armies or infected hosts spread across the network and under the control of a single master) are used for mounting DoS attacks. In addition, source addresses used for attacks can be spoofed, so that blocking an offending address is potentially useless.

In general, DoS attacks are easy to detect when they are brute-force, but, especially when highly distributed, they may be difficult to distinguish from a flash-crowd (i.e. an overload of the system due to many legitimate users accessing it at the same time).

Statistics and machine learning techniques have been proposed for detecting attacks at the server or network level. Some approaches try to analyze changes in the overall statistical behavior of the network traffic (e.g. the traffic distribution among flow flattens when a DDoS attack based on a number of microflows happens). Other approaches aim at statistically characterizing the normal behaviors of network flows or TCP connections, in order to detect significant deviations.

However, the Internet of Things (IoT) represents a completely different scenario and requires novel detection and reaction strategies. Its highly distributed nature implies that there is no central vantage point from which an attack can be observed. In addition, the scarce resources of the IoT force reporting from the nodes to a central location to be reduced to a minimum.

On top of the lack of global information, detecting DoS in the IoT is made harder by the fact that a much more subtle interference of the network's operations may be enough to bring the network down. For example, a jamming node can prevent a node from decoding traffic by just emitting short bursts when activity on the channel is detected. This can isolate a large portion of the network which uses that node as a parent and cut off a large portion of the network. In addition, in the case of battery operated nodes, a slow but steady flow of malicious traffic can exhaust a node's battery, thus making the node useless in a matter of days.

Due to the high variability of this kind of network, the symptoms of those attacks are not easy to detect and can be lost in the normal noise of the network behavior (traffic peaks and topology changes are quite normal in LLN). Therefore, an intelligent approach is needed that is able to reveal subtle changes in the measured data that are typical of a known anomalous behavior.

—Possible Attacks Against IoT—

Even though the existing literature regarding possible attack types against the IoT is limited, a number of attacks against sensor network technologies may apply with a few minor modifications. Such attacks can be roughly classified into two classes: 1.) insider attacks (i.e., where the malicious node needs to be authenticated and be in possession of the network encryption keys), and 2.) outsider attacks (i.e., where the attacker just needs to be within the radio range of the victims).

In particular, a number of attacks against routing performed by a malicious node in the DAG can be imagined. A node can, for example, perform selective forwarding. In other words, the node could just discard some of the traffic messages that it is asked to forward, while still participating correctly within the routing protocol. Although this can potentially be revealed by end-to-end mechanisms, detection of this type of attack can be difficult and slow due to the low traffic rate and lossiness of IoT networks. Other example attacks include a malicious node impersonating multiple identities or advertising forged routing information, so as to gain a central role in the routing topology.

While attacks belonging to the former class can be prevented through well-designed cryptography and authentication, in the latter case they have to be detected by monitoring the network environment.

The simplest form of attack that can be performed against an RF network is jamming. This consists in artificially creating an interference, so as to prevent message decoding. There are several variations of a jamming attack, with different degrees of complexity and subtlety. The attacker can continuously emit power on the spectrum (continuous jamming), create a collision when it detects activity on the channel (reactive jamming), or attack only a particular type of traffic (selective jamming). The damage from a jamming attack can be maximized if the attacker is able to estimate the centrality of a node in the routing topology. This can be obtained by accounting for the amount of traffic transmitted and received by each node, by leveraging the fact that the link layer addresses are in clear. Once the jammer has detected the most central node, it can try to make this node unreachable for its descendants, which will in turn be forced to select another parent. This can potentially create continuous route oscillations and convergences.

Other kinds of external DoS attacks can be performed by exploiting the fact that a number of messages in the WPAN do not need authentication, such as discovery beacons and some of the EAPoL messages used for authentication. In particular, discovery beacons can be used for injecting false synchronization information into the network, so as to prevent two nodes from meeting on the right unicast communication frequency. EAPoL authentication messages, instead, have to be relayed by the WPAN nodes up to the FAR, and from there until the AAA server. This mechanism allows an attacker to generate routable traffic, thus flooding the network and wasting bandwidth and processing power. A mitigation strategy may to have authentication requests be rate-limited. However this may result in legitimate nodes being prevented from authenticating when an attack is in progress.

Other attacks can be performed against networks that use the 802.11i protocol, which is used for exchanging key information between the authenticating node and the FAR (and therefore, cannot be protected by link layer encryption). Such attacks are documented in the scientific literature and aim at blocking the handshake between the client and the access point. This can be achieved by an attacker by interleaving a forged message between two messages in the handshake. This implicitly resets the handshake state, so that subsequent messages from the authenticating node are discarded.

—Frequency-Hopping and Synchronization in 802.15.4—

In a channel-hopping mesh network, devices communicate using different channels at different times. To communicate a packet, a transmitter-receiver pair must be configured to the same channel during packet transmission. For a transmitter to communicate with a receiver at an arbitrary time in the future, the transmitter and receiver must synchronize to a channel schedule that specifies what channel to communicate on and at what time. Channel schedules may be assigned to each transmitter-receiver pair independently so that neighboring transmitter-receiver pairs can communicate simultaneously on different channels. Such a strategy increases aggregate network capacity for unicast communication but is inefficient for broadcast communication. Alternatively, all devices in a network may synchronize with a single channel schedule such that all devices transmit and receive on the same channel at any time. Such a strategy increases efficiency for broadcast communication since a single transmission can reach an arbitrary number of neighbors, but decreases aggregate network capacity for unicast communication since neighboring individual transmitter-receiver pairs cannot communicate simultaneously without interfering. Mesh networks typically utilize both unicast and broadcast communication. Applications use unicast communication to communicate data to a central server (e.g. AMI meter reads) or configure individual devices from a central server (e.g. AMI meter read schedules). Network control protocols use unicast communication to estimate the quality of a link (e.g. RSSI and ETX), request configuration information (e.g. DHCPv6), and propagate routing information (e.g. RPL DAO messages). Applications use multicast communication for configuring entire groups efficiently (e.g. AMI meter configurations based on meter type), downloading firmware upgrades (e.g. to upgrade AMI meter software to a newer version), and for power outage notification. Network control protocols use multicast communication to discover neighbors (e.g. RPL DIO messages, DHCPv6 advertisements, and IPv6 Neighbor Solicitations) and disseminate routing information (e.g. RPL DIO messages). Existing systems optimize for both unicast and broadcast communication by synchronizing the entire network to the same channel-switching schedule and using a central coordinator to compute and configure channel schedules for each individual device, or else more efficiently optimizing for both unicast and broadcast communication in a channel-hopping network without need for centrally computing schedules for individual nodes.

In order to join the WPAN enabled with frequency hopping (e.g., an 802.15.4 WPAN), a node needs to synchronize on the frequency hopping schedule of its neighbors. Therefore, each node in the WPAN broadcasts its unicast reception schedule via a discovery beacon, which is not encrypted and sent on every frequency: this allows nodes joining the PAN to join. In greater detail, the discovery beacon message is sent a broadcast destination WPAN and includes several information elements, most notably:

The WPAN SSID string

The unicast scheduling information. In one implementation, this is made up of a slot number and an offset value. This allows the receiving node to compute the slot number the sending node is currently is, and thus, by applying a hash function, to know its current receiving frequency. Note that this algorithm does not require the clocks of the two nodes to be synchronized.

The transmission of a discovery beacon is triggered by an associated trickle timer. However, the information about the scheduling of the broadcast slot is not included in such a beacon, but only in the synchronous and unicast beacons, which are encrypted with the network key. In particular, the synchronous beacon is triggered by a trickle timer and it is sent on every frequency (just as the discovery beacon). The unicast beacon, on the contrary, is sent upon request by another node by using a standard unicast transmission. In both cases, the beacon includes a broadcast scheduling information element, which has the same format of the unicast scheduling IE (Information Element). As a consequence, an attacker can interfere with its target during its unicast slot, but ignores the broadcast frequency schedule: the broadcast schedule is therefore much better protected against DoS attacks.

—802.15.4 Security—

Currently, IoT architecture comes with several embedded security mechanisms. The cornerstone of IoT security is indeed link layer encryption, which is mandatory for most frames (including routing messages and application traffic). Besides pure encryption, link layer security ensures message integrity (through an encrypted MAC code) and message non-replication (through an encrypted sequence number included in the encrypted message payload).

In order to install the necessary link layer keys on every node, an authentication procedure is carried out when the node joins the network. Such a procedure is based on the EAPOL protocol, which is carried directly over layer 2 messages and is used for transporting authentication data from the node to the FAR (notice that such messages are not encrypted). On top of EAPOL, two main protocols are carried: EAP messages, which the FAR tunnels to an AAA server through the RADIUS and 802.11i messages, which are used for exchanging cryptographic material between the FAR and the node.

In greater detail, EAP messages are used by the node for mutual authentication with the AAA server and securely agree on a shared secret; to this end, a complete TLS handshake is, in turn, tunneled over EAP messages and a public key mechanism based on X509 certificates is used for identity validation. Once such shared secret has been established, the AAA server transmits it to the FAR, which, in turn, uses it for exchanging the link layer keys with the node through the 802.11i protocol.

Notice that the shared secret negotiated through EAP is stored by the node in persistent memory and can be reused for subsequent authentication (in this case, EAP is skipped and the link layer key is directly exchanged through 802.11i).

Distributed Learning in a Computer Network

As noted above, denial-of-service (DoS) attacks are emerging as a major threat to today's interconnected network infrastructure, causing governments and companies millions of dollars-worth of damages every year. While current technologies offer good guarantees in terms of data integrity and confidentiality by using sophisticated encryption techniques, they still fail in protecting the network infrastructure from DoS attacks. Those attacks, indeed, do not require an intruder to break into the cryptography of the system; a skilled attacker can make a network or a network element unavailable by simply "choking" it with a particular pattern of non-authenticated traffic.

The kind of threat presented by a DoS attack is very dangerous in the global internet, where it is amplified by the emergence of botnets, i.e., armies of compromised hosts spread through the global network and coordinated by a central puppet master in order to perform an attack against a single target.

The potential for DoS attacks is even greater against technologies using shared physical media. Prominent examples of shared physical media are link layer technologies using wireless communications (e.g., 802.11 and 802.15.4) and power line communication technologies (e.g., 1901).

LLN networks, which are envisioned for the IoT, are ideal targets for DoS attacks, in particular. Indeed, the combination of an open physical medium and nodes with very limited capabilities makes LLN networks a vulnerable target. Bandwidth, memory, processor power and, in some cases, battery power are so limited for those devices that an attacker can prevent the network from working even with a relatively limited amount of malicious traffic. For instance, in a WPAN with 5,000 nodes connected through wireless links with a maximum bandwidth of 75 Kbits/s, the capacity of very central nodes can be saturated by an attacker transmitting just very thin packet flows from a few points in the large WPAN physical range.

Besides exposing larger vulnerabilities, the nature of LLNs also makes DoS attacks much harder to detect. In particular, while a DoS attack in a wired network is generally associated with a high traffic peak and can be detected by using a simple threshold-based approach, a DoS attack in a LLN requires a much lower amount of traffic. Therefore, the malicious traffic that generates the attack can be completely hidden in the middle of normal network traffic, which makes classical threshold-based approaches ineffective.

According to various embodiments, the techniques and architecture herein provide a full-fledged architecture for detecting DoS attacks and other network conditions in large-scale networks by using machine learning models, such as ANN classifiers. The techniques are designed to work in a very constrained environment (e.g., a network having dozens of thousands of nodes, low speed bandwidth, etc.). In particular the techniques and architecture herein have very limited overhead, by using a large set of distributed, adaptive, and collaborative approaches. The techniques herein consider all the building blocks that are necessary for deploying such a system, from the mechanism for collecting labeled training data to the use of a distributed classifier for detecting attacks, passing through the distributed training and validation of classifiers and the synchronization mechanisms for coordinating data collection and avoiding data corruption. Furthermore, the system is highly distributed and exploits the hierarchical organization of those networks with a system that is also highly hierarchical, growing in complexity while approaching the core of the network. As will be appreciated, while the disclosed techniques and architecture are described primarily in the context of LLNs, the same approaches may be applied to other networks as well (e.g., PLC networks, 802.11-based networks, etc.).

Said differently, the techniques herein specify a distributed architecture making use of machine learning models (e.g., ANNs, etc.) in a constrained network for distributed DoS attack ((D)DoS) attack detection. The techniques specify several agents hosted in different places of the network (e.g., at the low-end, routers such as FAR, NMS/ User agent), each responsible for different actions. The techniques as described below then list several actions to take place in the architecture, such as the data collection, generation of controlled attacks to gather features of interest, training of the ANN or other model, and finally the detection of the attacks using the classifiers computed by the ANN. In addition, the techniques herein allow a central engine such as a NMS receiving alarms notification to determine whether or not an attack effectively took place, thus reducing the risk of false positives.

Machine learning has been used for detecting particular attacks under controlled scenarios. In general, however, many LM-based approaches to solve complex problems such as (D)DoS attacks all make the assumptions that the data is always available, the approach is centralized, infinite resources are available, etc. In contrast, the techniques herein specify an architecture that is capable of dealing with a number of complex and real-world aspects, covering a vast spectrum of solutions, in addition to innovative technologies for learning machine-based network solutions for DoS attacks.

Specifically, according to various embodiments, a first data set is received by a network device that is indicative of the statuses of a plurality of network devices when a type of network attack is not present. A second data set is also received that is indicative of the statuses of the plurality of network devices when the type of network attack is present. At least one of the plurality simulates the type of network attack by operating as an attacking node. A machine learning model is trained using the first and second data set to identify the type of network attack. A real network attack is then identified using the trained machine learning model.

Operationally, as shown in (and with general reference to) FIGS. 4A-7E, an architecture is specified for networks such as LLN (note that the techniques are not limited to LLNs), which is made up of several building blocks. In particular, the network architecture may include any or all of the following:

An agent on each of the nodes of a network, such as a LLN. This is the lowest component in the hierarchy and is capable of collecting data about the link, physical and IP layers of the network. The node is also configured to report statistics to a router such as a Field Area Router (FAR) managing its PAN, performing some of the attack detection steps, and/or turning the node into an attacker for generating labeled training data. For example, in a Smart Grid network, such an agent can be the communication module hosted on the meter.

An agent on the FAR that is configured to both receive the statistics produced by the nodes and to query the nodes for additional information. In some embodiments, the FAR may also have full visibility of the IP topology of the PAN and may train and apply the learning machine in charge of the final decision about the detection of an attack.

A NMS/policy engine, which has visibility on a set of FARs and may provide a human-friendly interface for managing the detection system. Each FAR will obtain the address of its corresponding policy engine which can be dynamically discovered or statistically upon node registration to the NMS. Furthermore, this policy engine may participate in the collaboration mechanisms that involve several FARs for collecting data and training classifiers.

The architecture described herein covers the whole solution in order to use a Learning Machine such as a LLN for detecting attacks, organized here in four parts.

—Part-1: Data Collection for Training—

According to various embodiments, the first component of the architecture, as illustrated in FIGS. 4A-4G, is a mechanism allowing the collection of a correctly labeled data set for training the LM. Collection of a data set is typically an important step since the learning machine has to be trained using representative data of the managed network.

In order to correctly classify the observed behaviors, the learning machine needs two correctly labeled datasets: one data set where no attack is present and one data set containing DoS attacks.

Figure 4A:
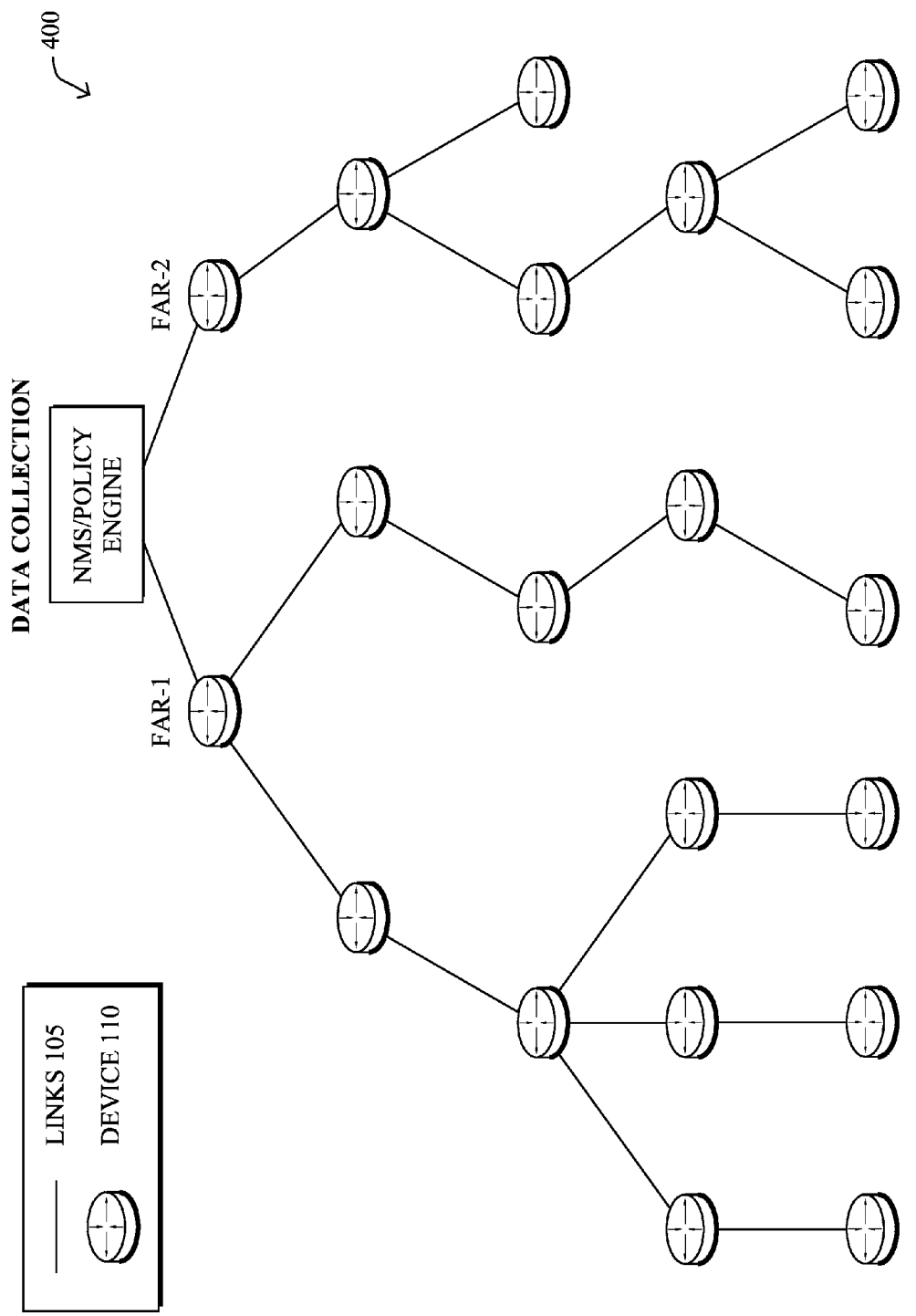
FIGS. 4A-4G illustrate example techniques for collecting feature data in a computer network.
Figure 4B:
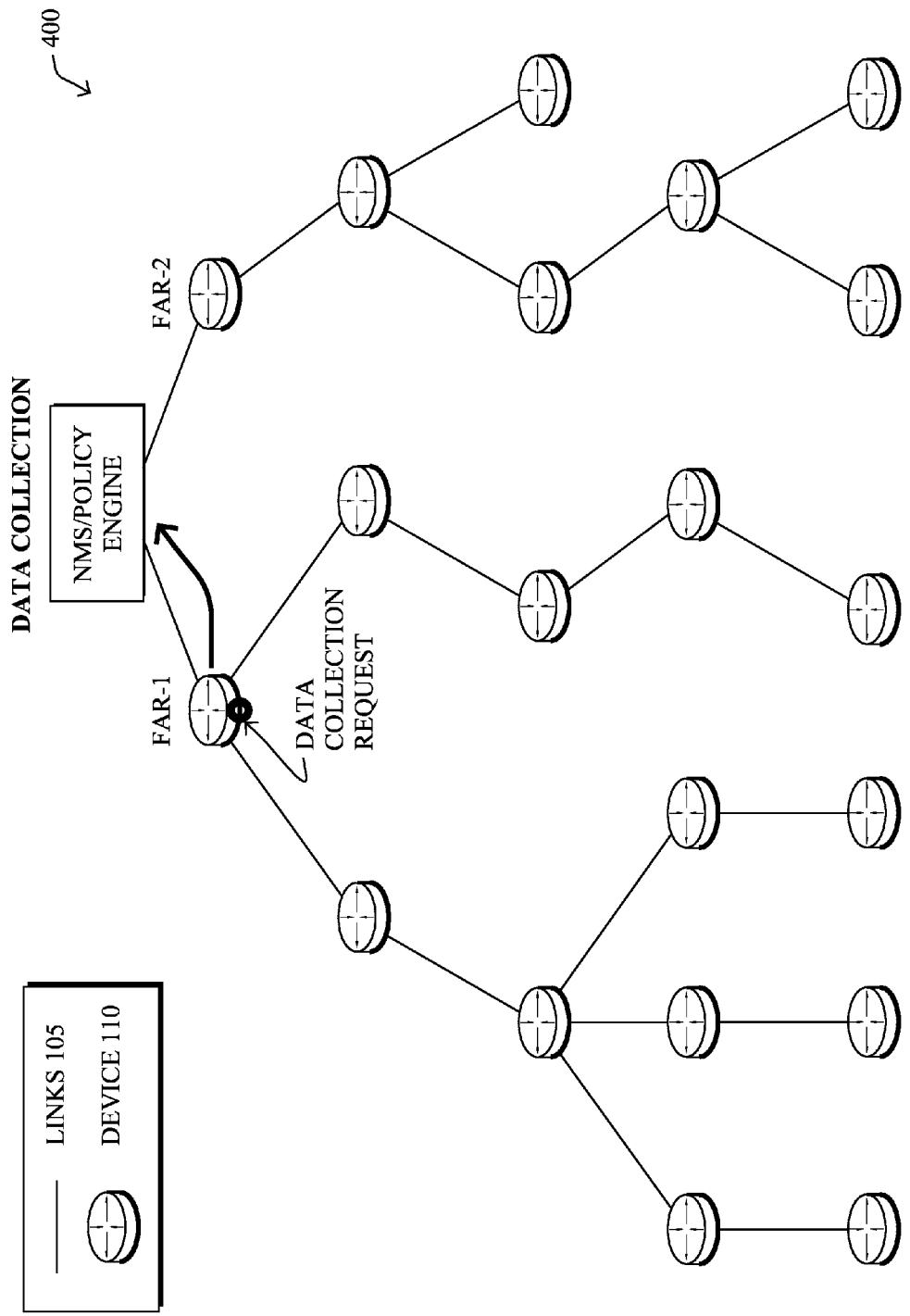

The first phase of data collection may entail gathering attack-free data with a large spectrum of conditions (e.g., the density of the nodes in the network, traffic load, etc.). As shown in FIG. 4B, data collection may be initiated by the agent on the FAR (e.g., FAR-1), which will need to query the policy engine for authorization. In contrast with existing approaches, in a constrained network, data collection performed in a distributed fashion may be performed at an appropriate time. Thus, in one embodiment, the policy engine may postpone the data collection activity in case some higher priority activity needs to be performed in the network. Also, data collection may involve some reporting traffic, which may be incompatible, for example, with a firmware update or another kind of application traffic which needs a particular QoS level.

In one embodiment, the agent on the FAR sends a newly defined unicast IPv6 message such as a CoAP message called a Collect_Req message to the policy engine, as shown in the example of FIG. 4B. The Collect_Req message may include any or all of the following TLVs:
1) The ID of the FAR
2) An estimated duration
3) The list of the required features and estimated volume of data which may be used by the policy engine to determine whether data collection can take place according to the expected impact at this moment in the QoS of the user traffic.

The combination of the above features may be used by the policy engine for evaluating the impact of data collection on the network traffic and deciding whether the data collection campaign can be launched or should be postponed.

Figure 4C:
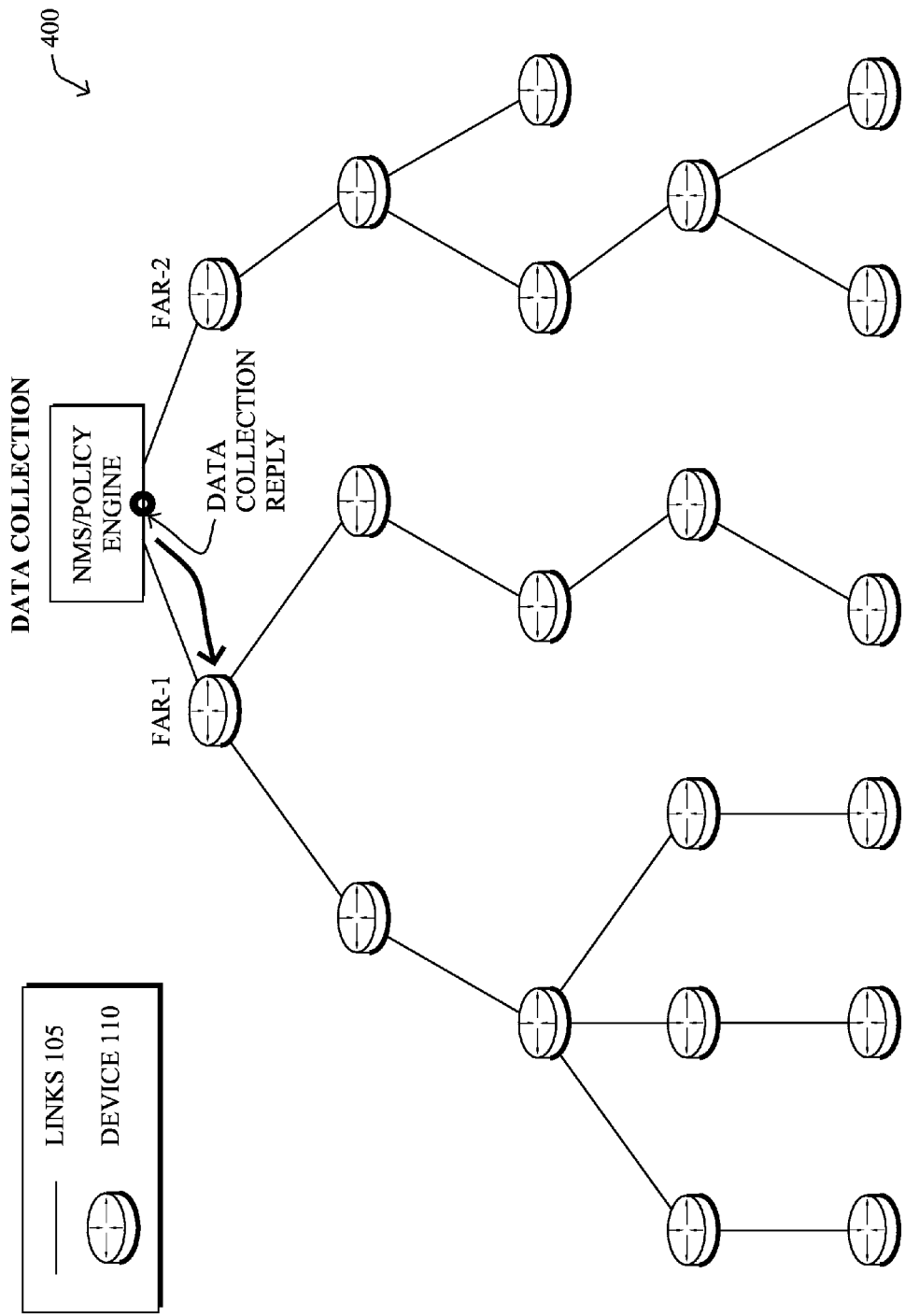

The policy engine, in turn, may respond with a data collection response/reply message, as shown in FIG. 4C. In one embodiment, such a message may be a newly defined unicast IPv6 message, such as a CoAP message called Collect_Rep message sent to the requesting FAR, which may be positive or negative, in which case the FAR may be asked to modify the parameters of its data collection. In other words, the policy engine may require the FAR to reduce the duration or the traffic overhead of the data gathering or to postpone the data collection or even not perform data collection according to the policy.

Figure 4D:
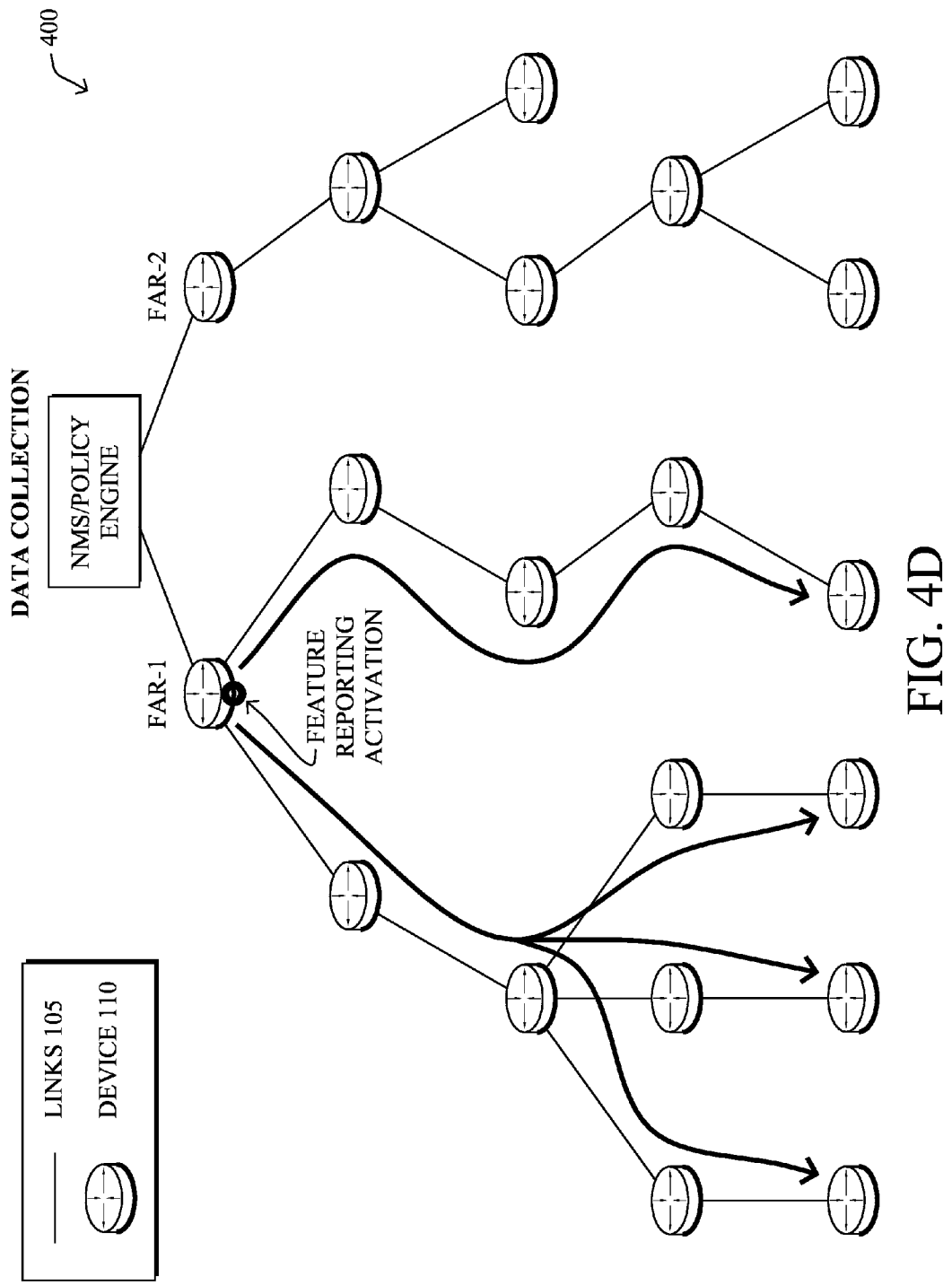
Figure 4E:
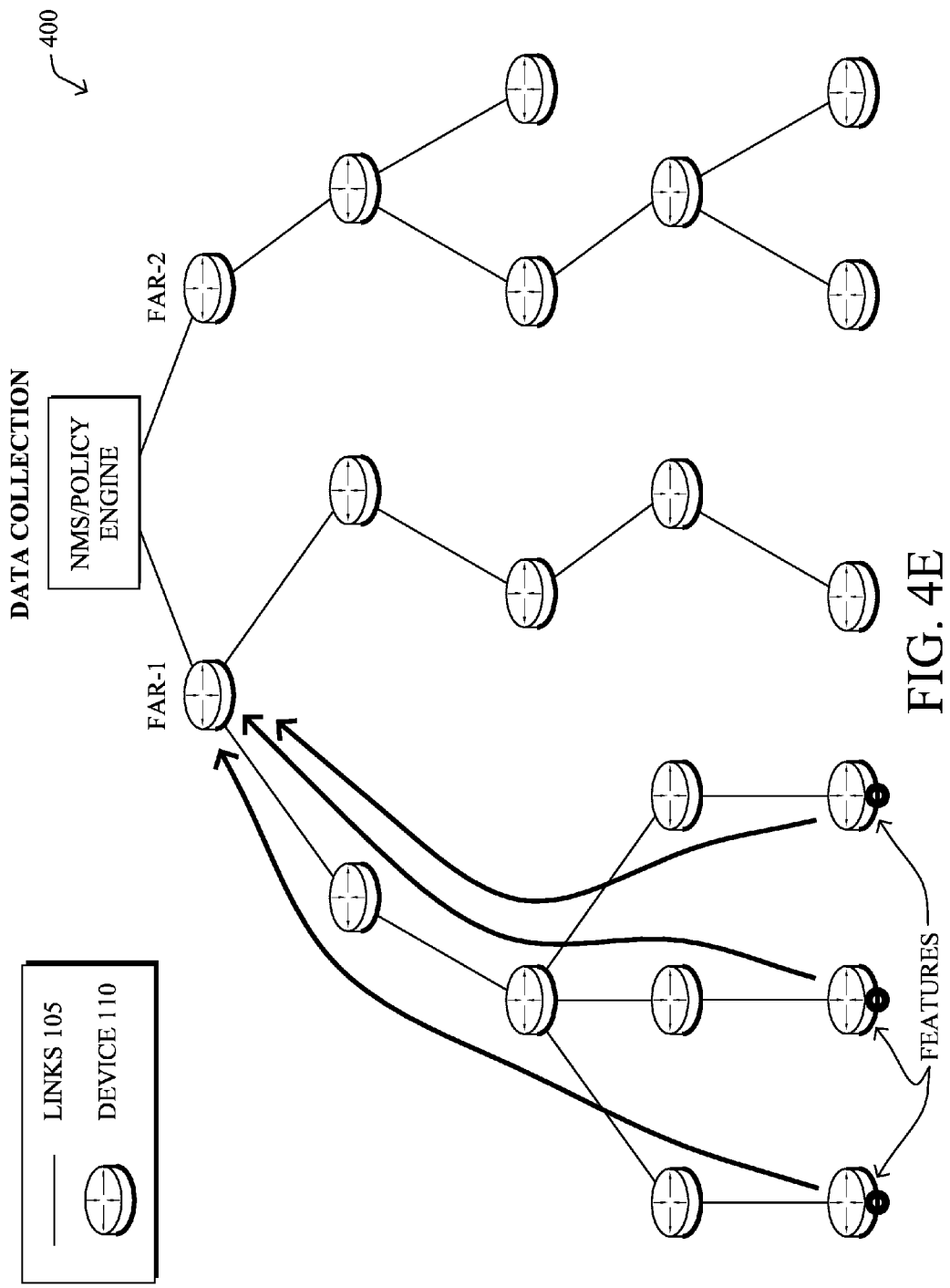
Figure 4F:
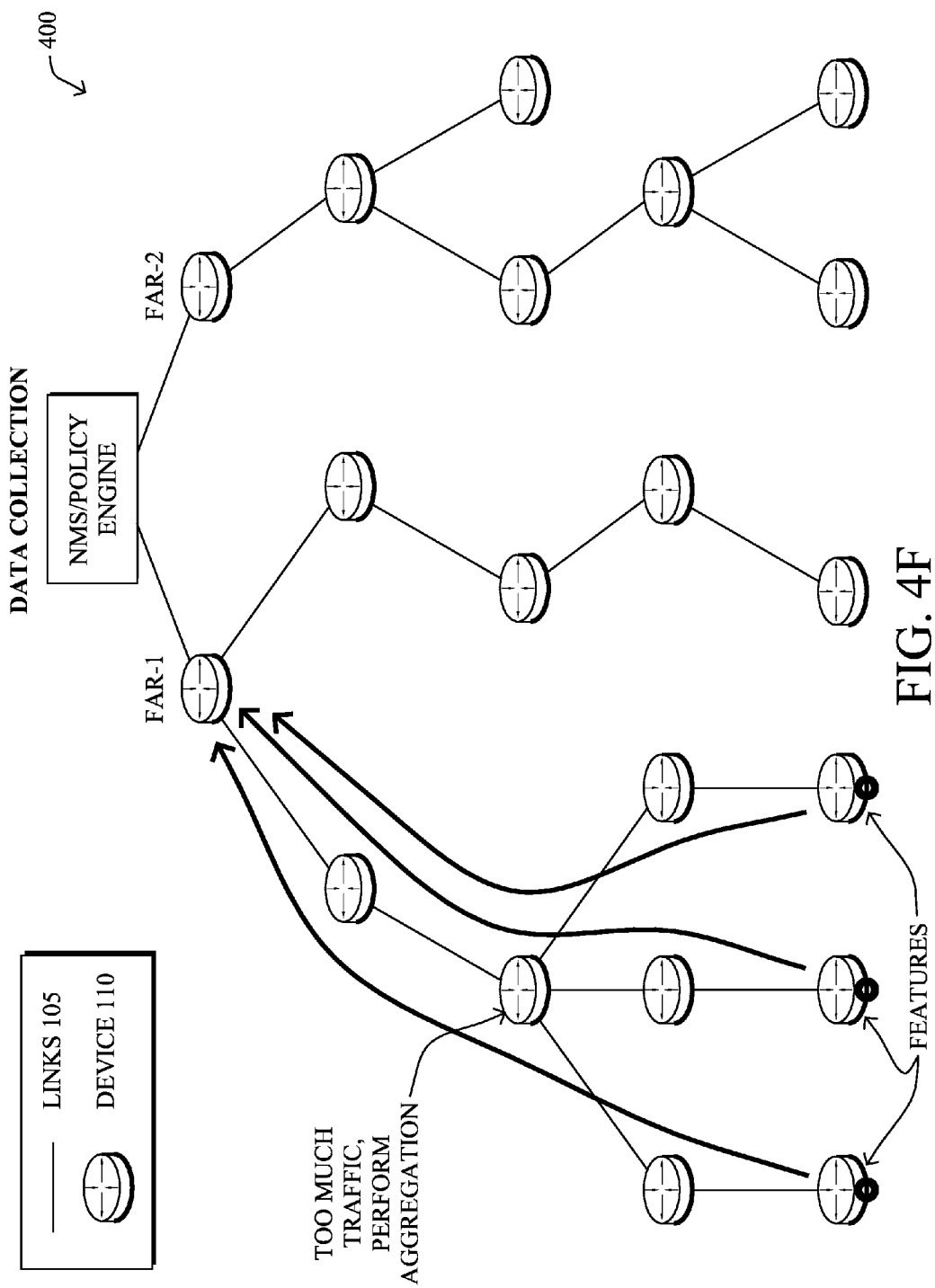
Figure 4G:
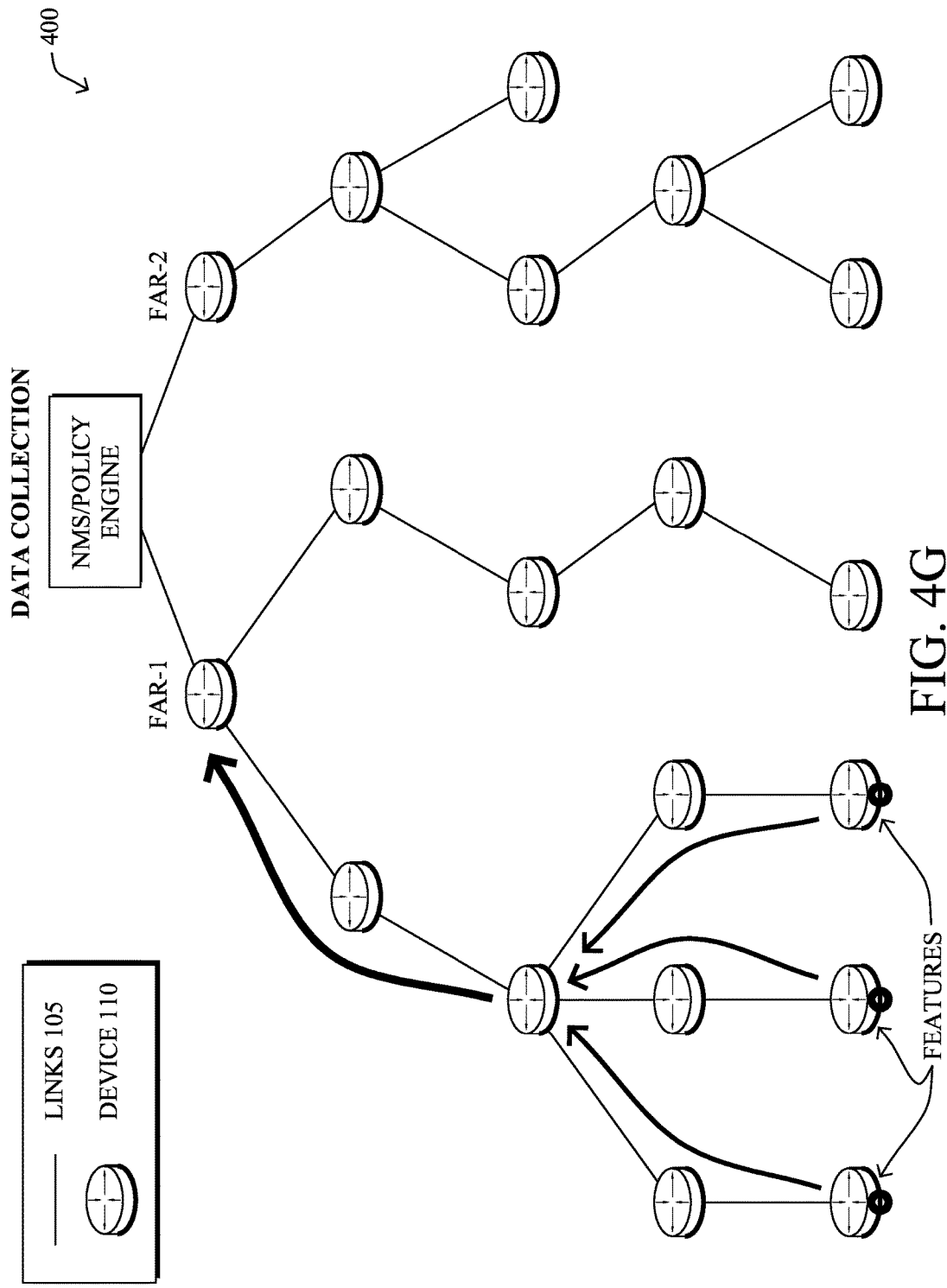

Data gathering may involve retrieving any number of features, from various sources. Example sources may include, but are not limited to, FAR-local sources (e.g., the RPL topology), FAR-intercepted sources (e.g., DPI), or remote sources (e.g., thereby requiring the FAR to pull information from remote nodes). For example, as shown in FIGS. 4D-4E, FAR-1 may request or retrieve feature data from remote nodes in its network. In some cases, the amount of data required may potentially be large, requiring sophisticated techniques of aggregation. For example, as shown in FIGS. 4F-4G, one or more intermediary nodes between the FAR and the reporting nodes may aggregate the feature data, to reduce the resulting amount of traffic.

—Part-2: Attack Triggering for Data Collection—

After a sufficient attack-free dataset has been collected, a dataset including attacks may be generated in order to appropriately train the ANN or other learning machine. Thus, the techniques herein provide mechanisms whereby attacks are generated and simulated (i.e., initiated by the network itself in a controlled manner). In a simple form, attacks may be generated using a traffic generator. In a more sophisticated scenario, the learning machine hosted on the router (e.g., a FAR) may select nodes of its WPAN to act as attackers, thus being able to correctly label the gathered statistics. In other words, this component of the techniques and architecture manages the generation and collection of this type of labeled data.

As shown in the example of FIGS. 5A-5F, a FAR agent is illustratively in charge of scheduling such controlled attacks.

In one embodiment, the FAR agent (i.e., the learning machine hosted on the FAR) selects the nodes to be turned into attackers by using a learning machine-agnostic policy (e.g., by random or round robin selection). However, this approach may lead to poor variability in the collected dataset, which can produce ANN classifiers with a poor performance as well as poor and slow convergence of the training process. More sophisticated approaches can be used, in other embodiments, to choose the node so as to maximize the feature space coverage. This increases the variability captured in the dataset and improves convergence in the training.

Figure 5A:
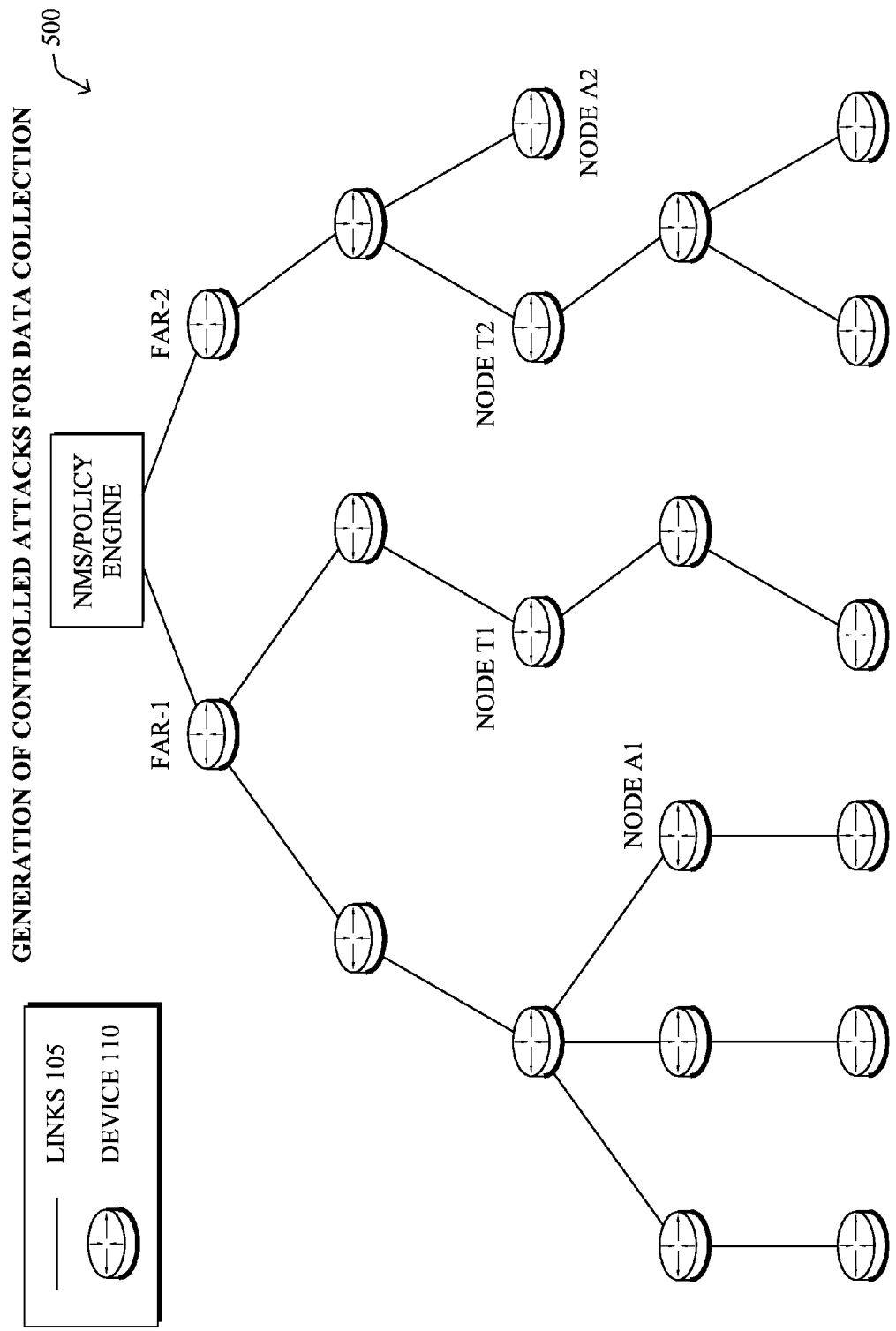
FIGS. 5A-5F illustrate example techniques for generating feature data by simulating network attacks.
Figure 5B:
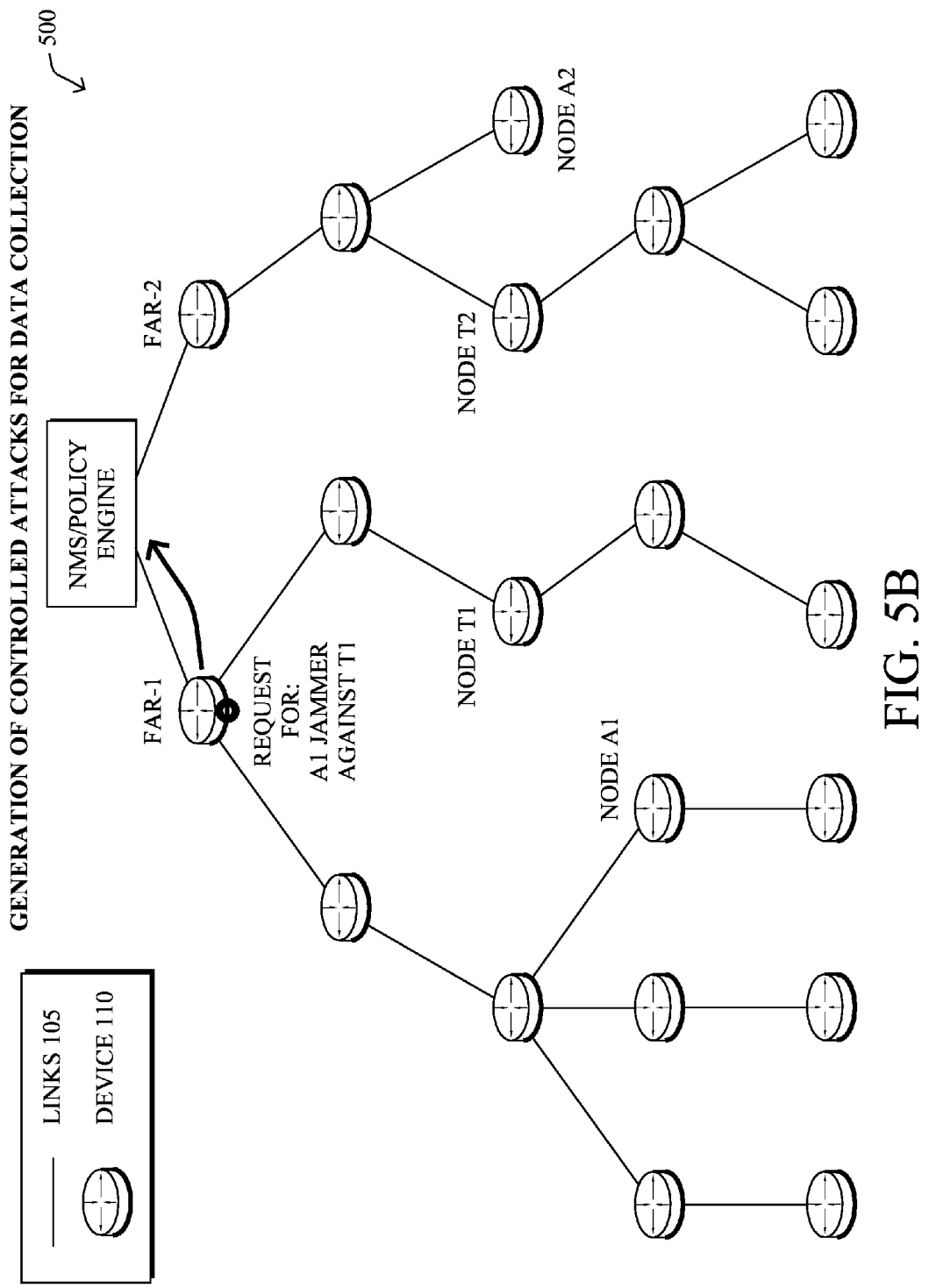
Figure 5C:
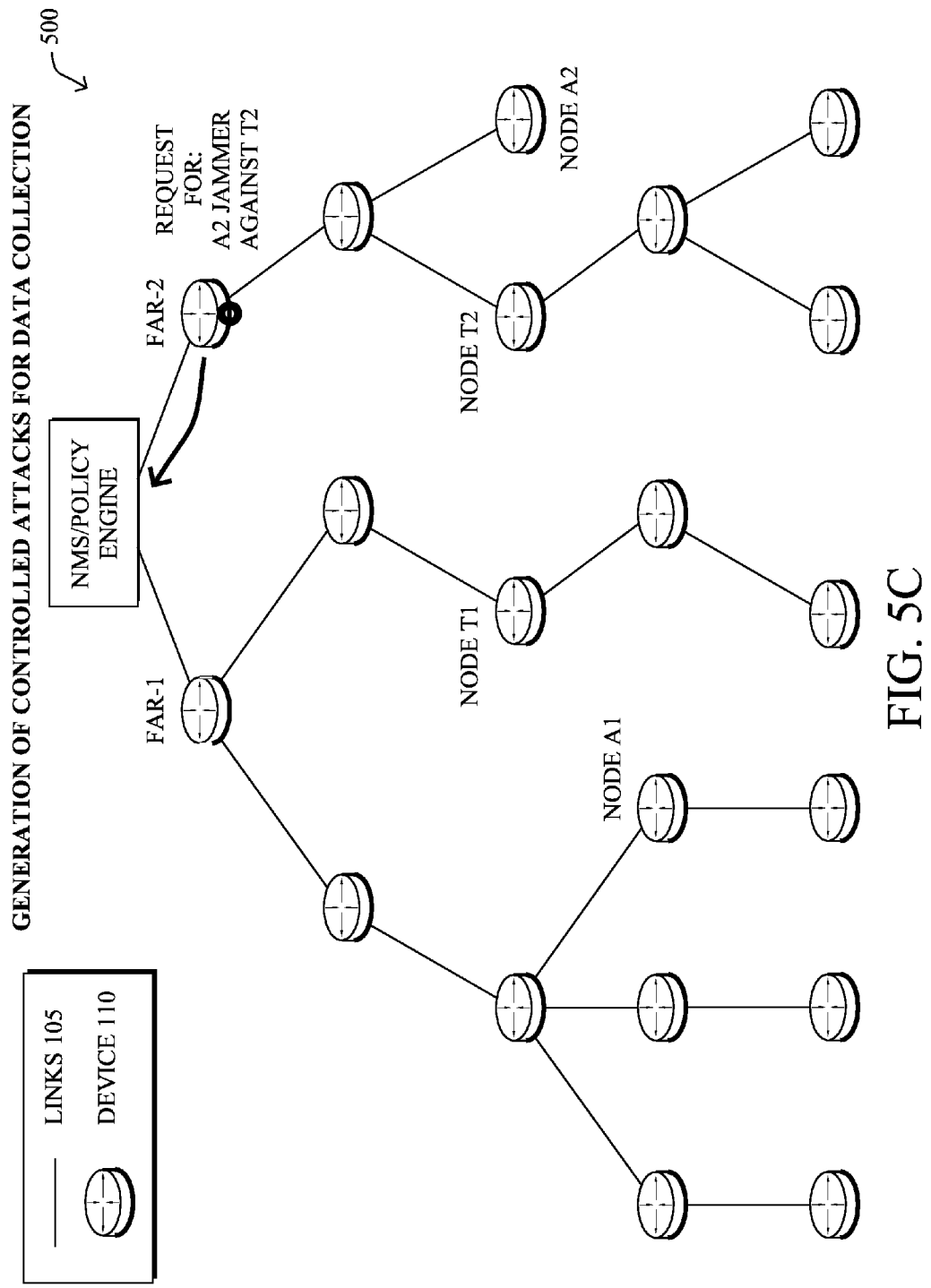
Figure 5D:
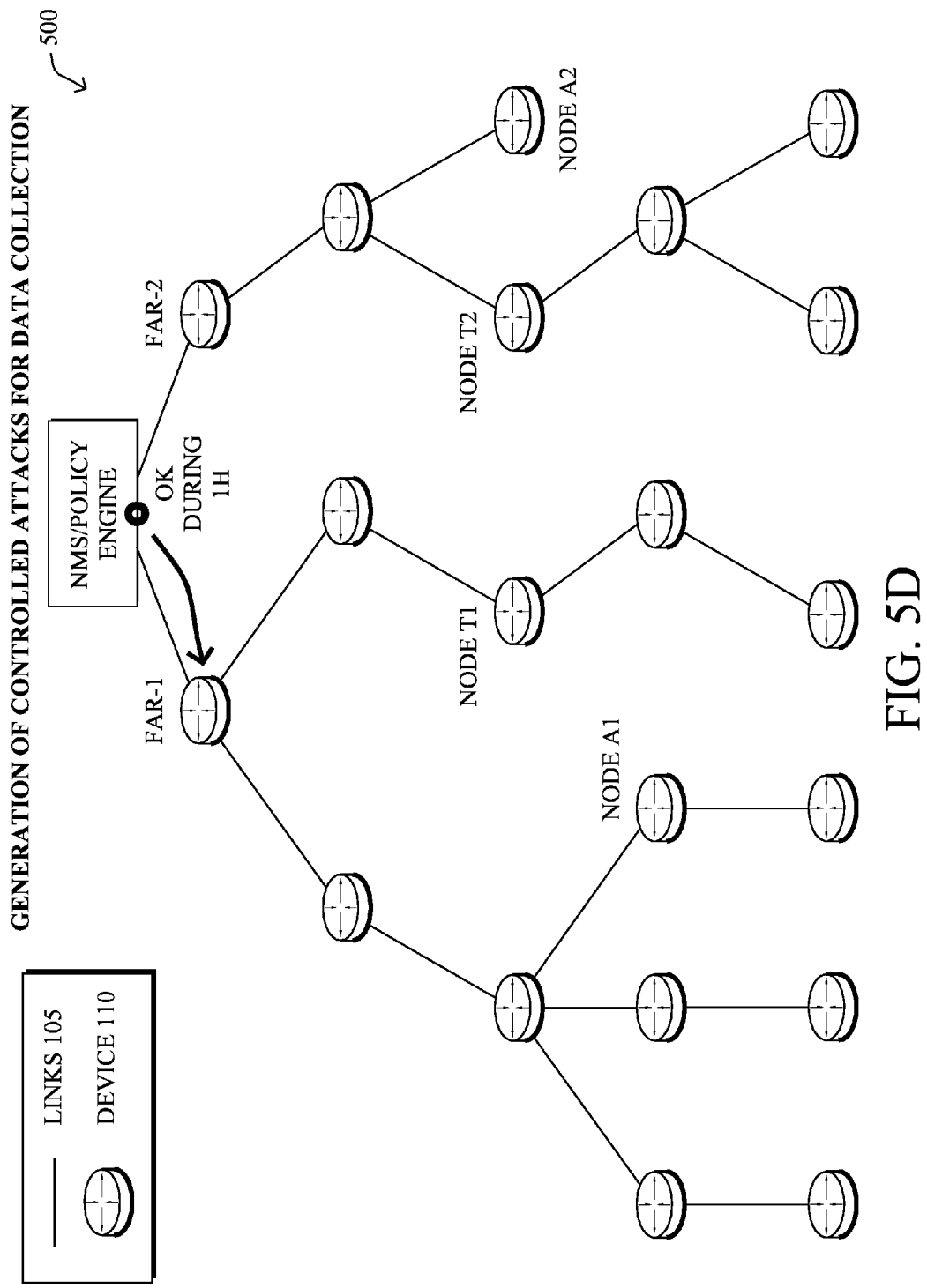
Figure 5E:
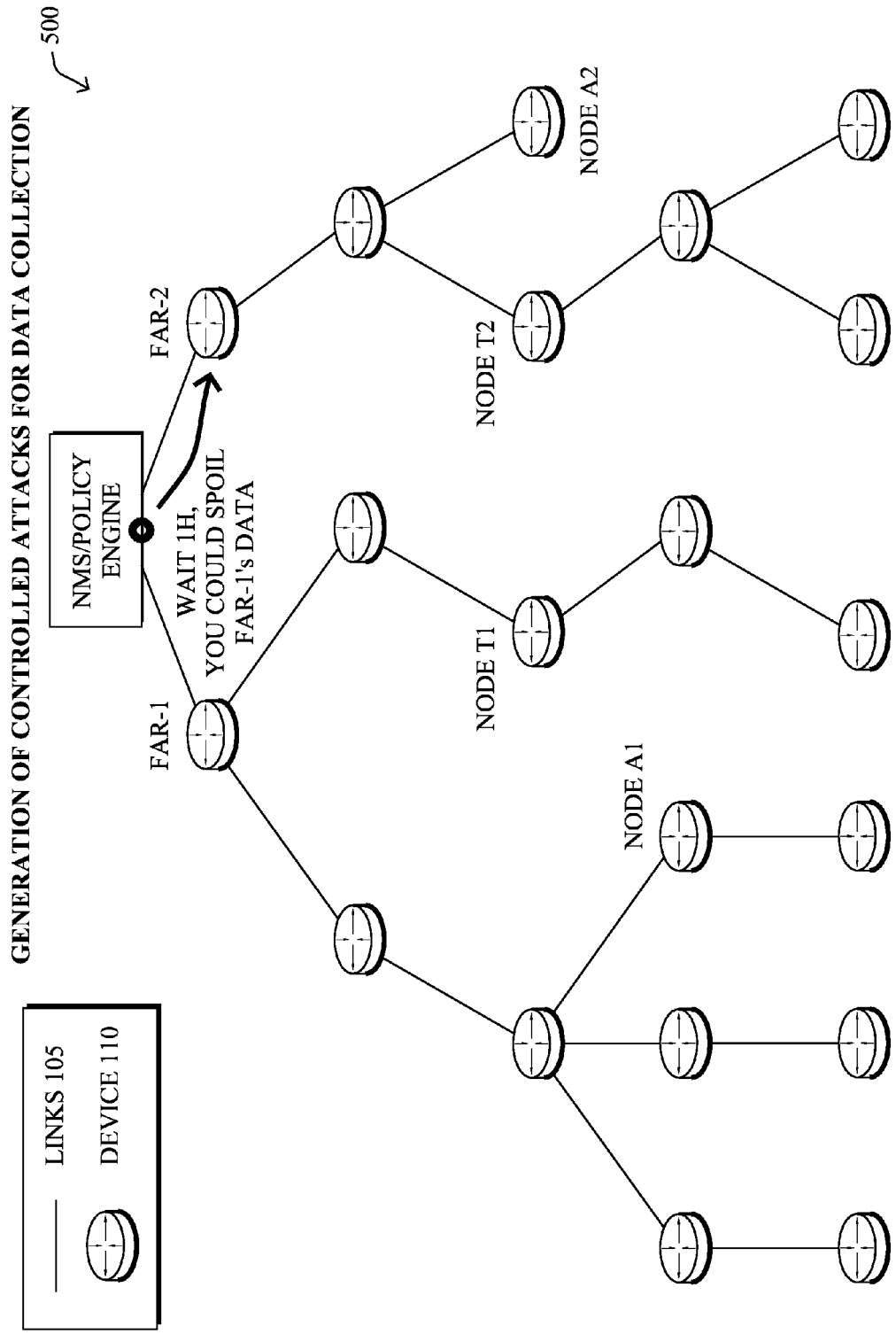
Figure 5F:
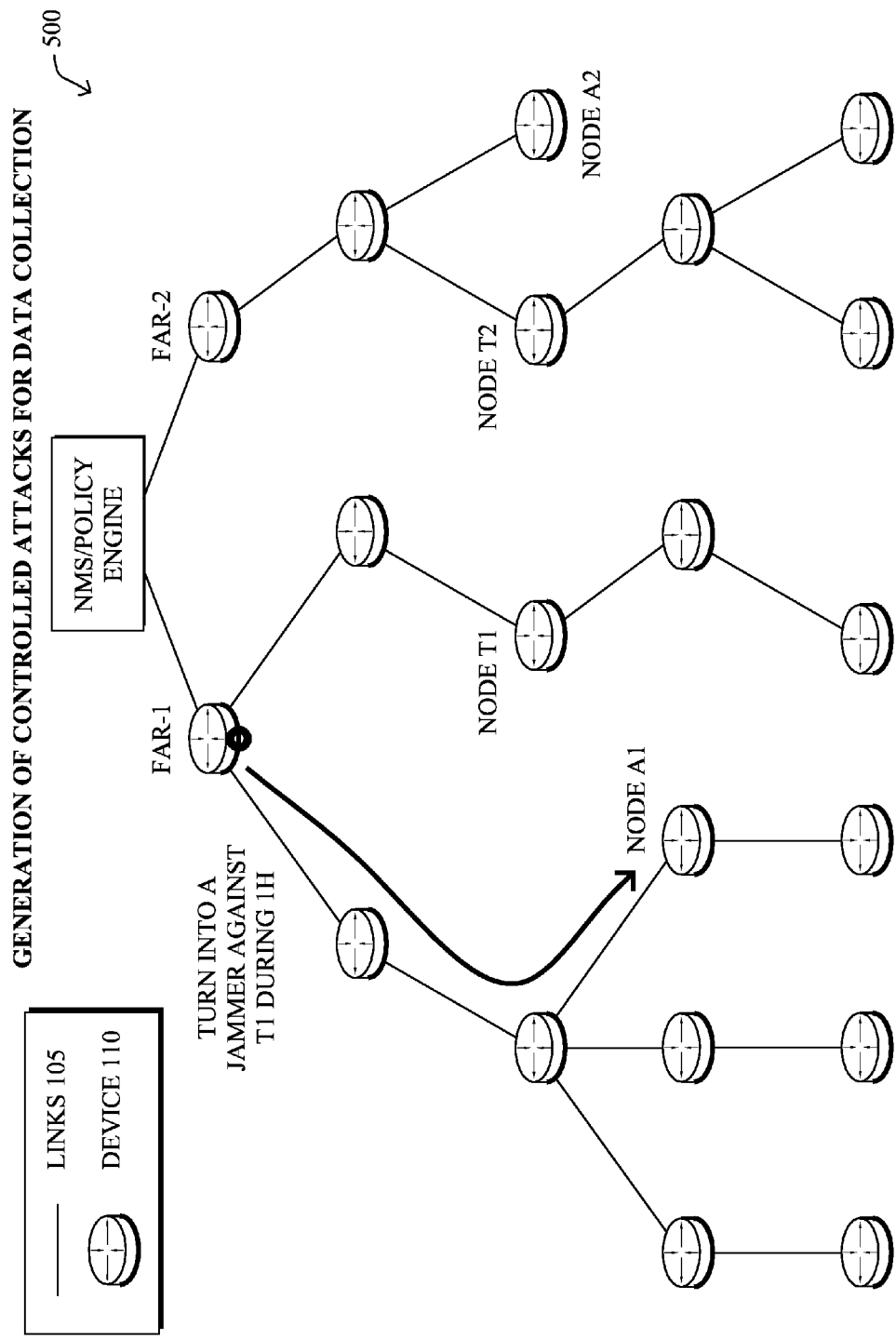

In case multiple PANs reside in the same physical range, performing controlled attacks in a PAN may lead to the incorrect data labeling by another FAR. Indeed, data collected by a FAR that is not triggering attacks can be corrupted by attacks triggered by another FAR in a nearby network. For example, FAR-1 and FAR-2 in FIG. 5A may each attempt to turn nodes in their respective PANs into attack nodes to simulate network attacks. In some embodiments, therefore, a mechanism is defined to perform inter-FAR coordination. For example, as shown in FIGS. 5B-5C, each FAR may request that a node be turned into a simulated attacker from the NMS/policy engine. In one embodiment, the policy engine may compute the scheduling for each FAR in a centralized way. For example, the NMS may clear FAR-1 to initiate an attack during a first hour (1 h), as shown in FIG. 5D. Similarly, the NMS may instruct FAR-2 to postpone its attack during this time, since it may conflict with the attack initiated by FAR-1, as shown in FIG. 5E. In response, as shown in FIG. 5F, FAR-1 initiates the simulated attack during the scheduled time period by turning a node in its network into an attacker.

—Part-3: Model Training—

Figure 6A:
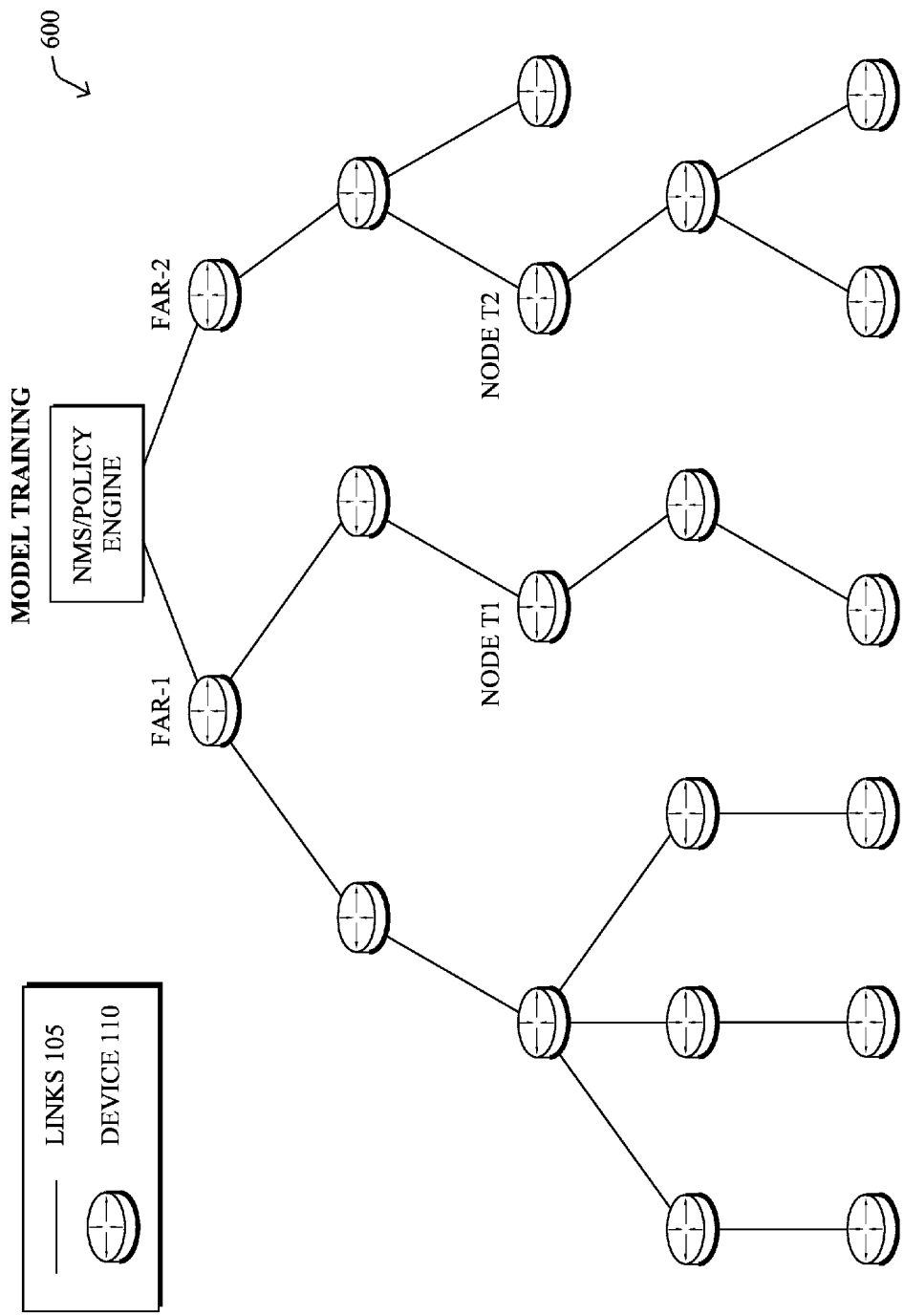
FIGS. 6A-6P illustrate example techniques for training a machine learning model in a computer network.
Figure 6B:
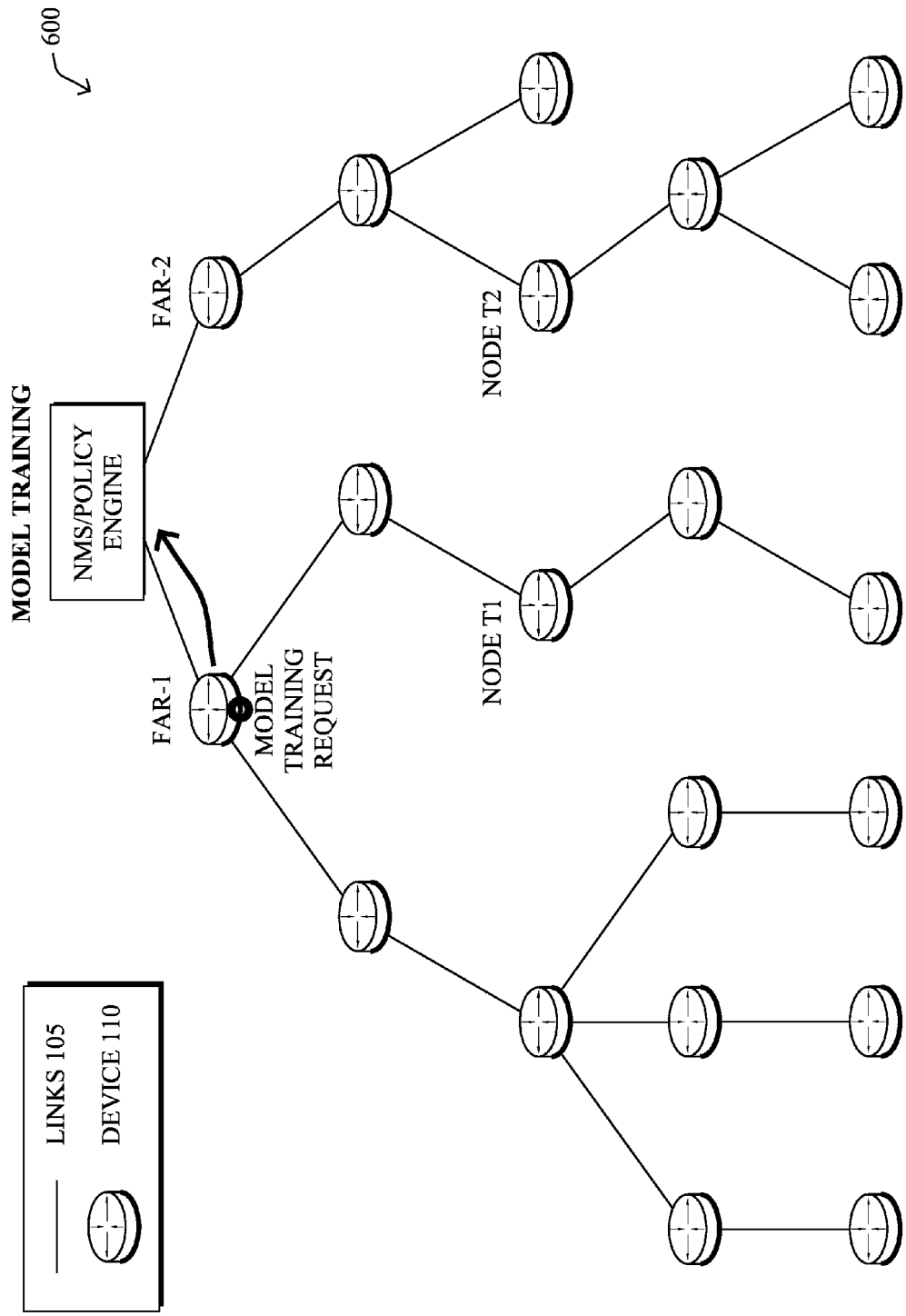
Figure 6C:
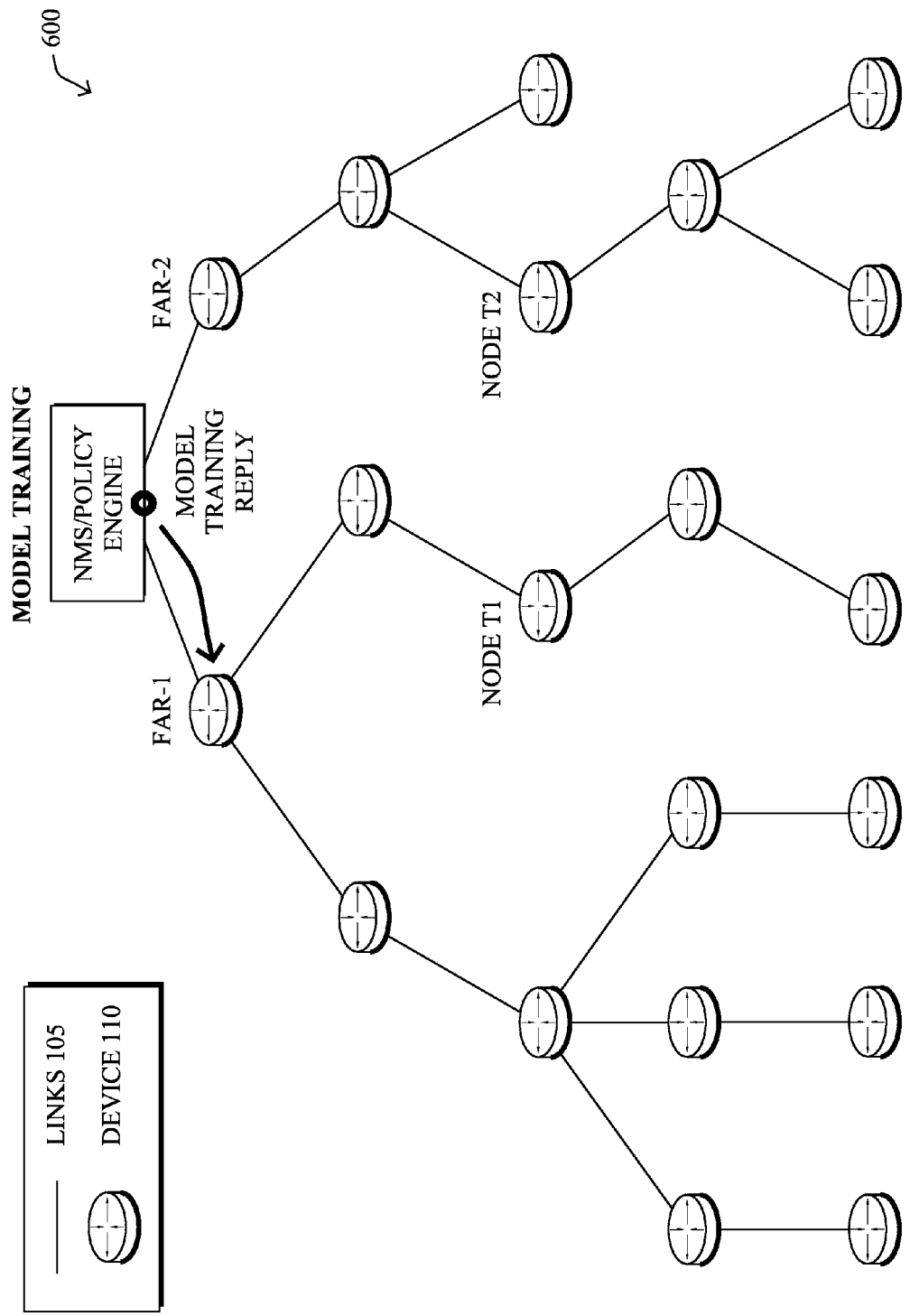
Figure 6D:
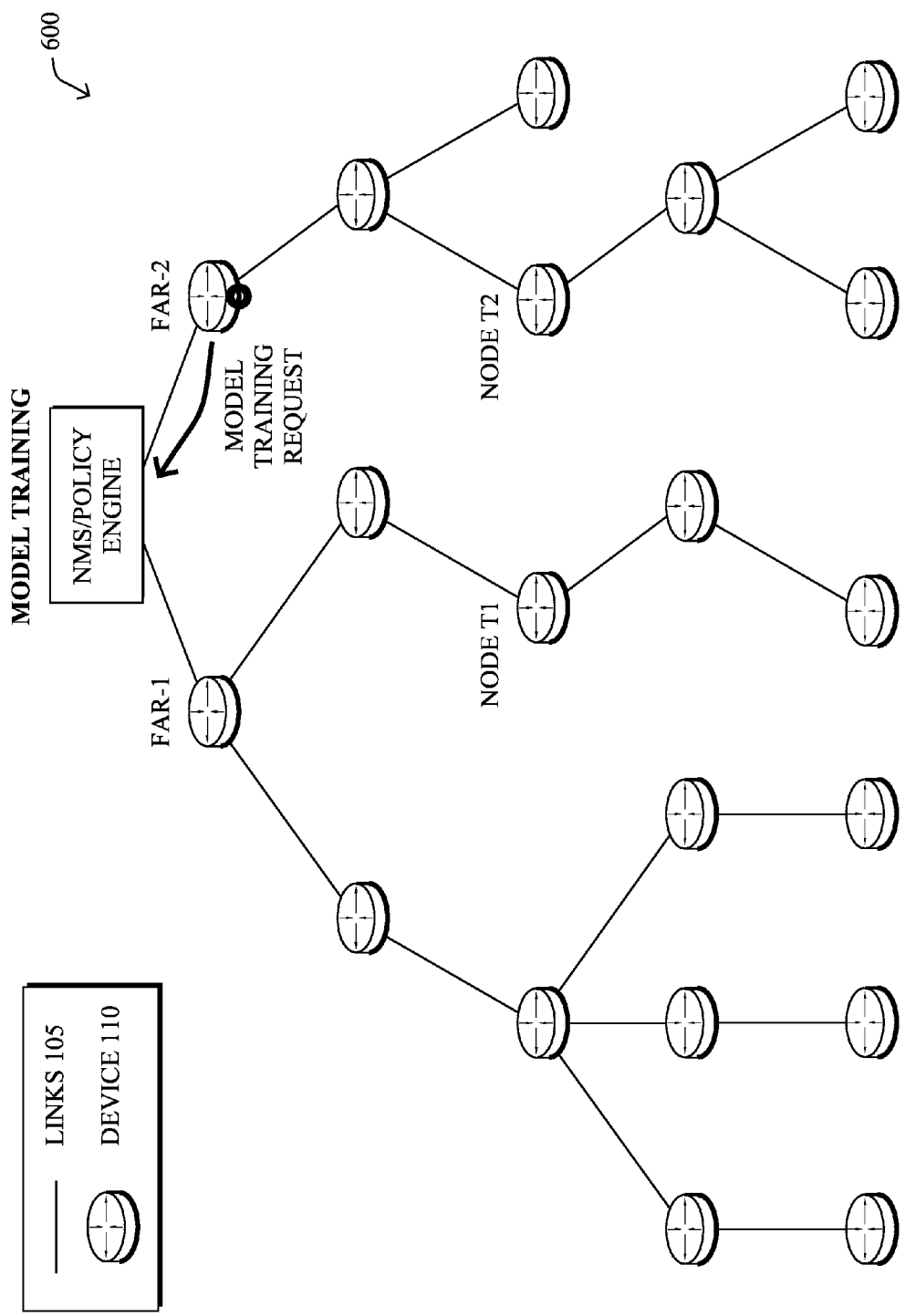
Figure 6E:
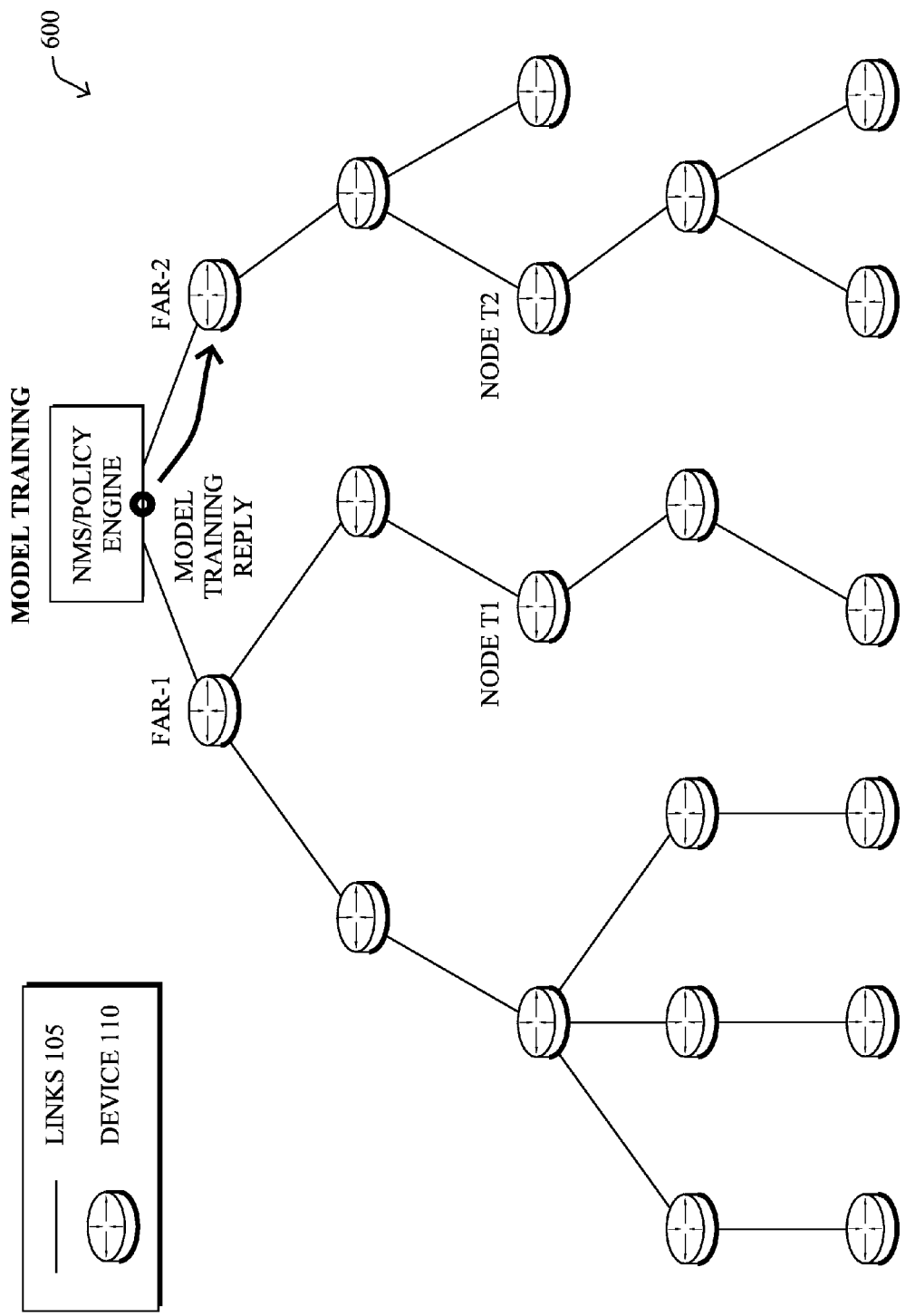
Figure 6F:
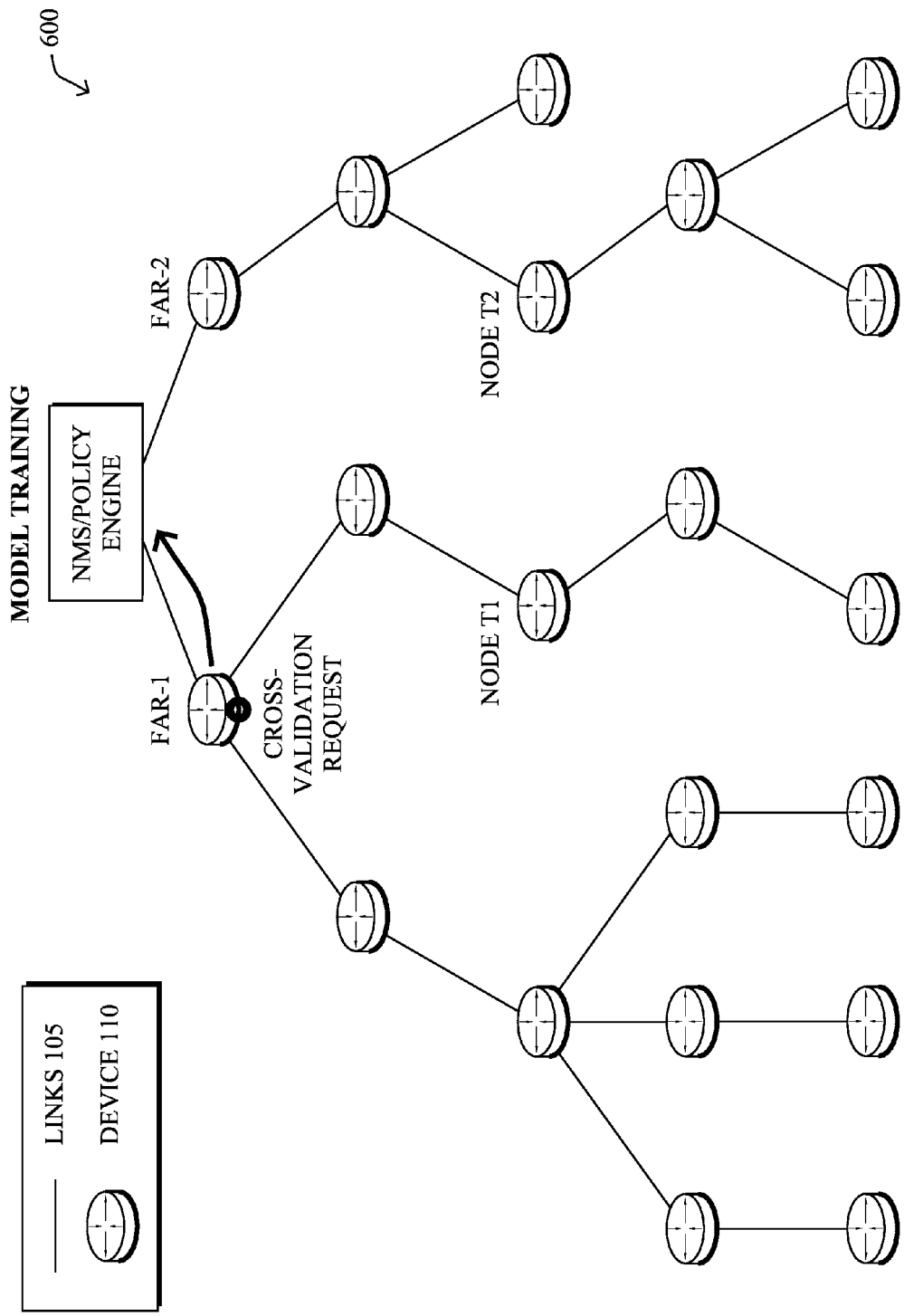
Figure 6G:
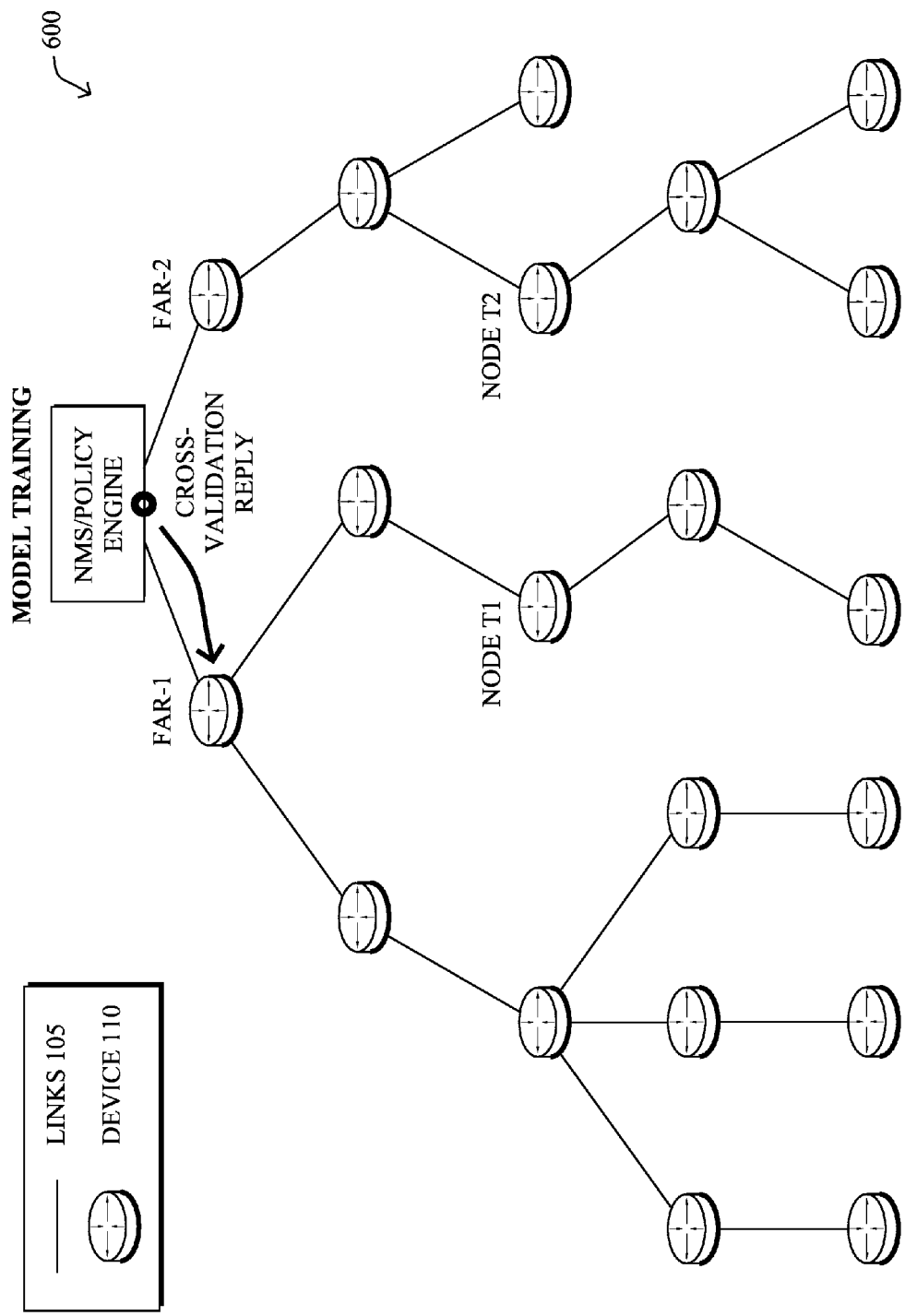
Figure 6H:
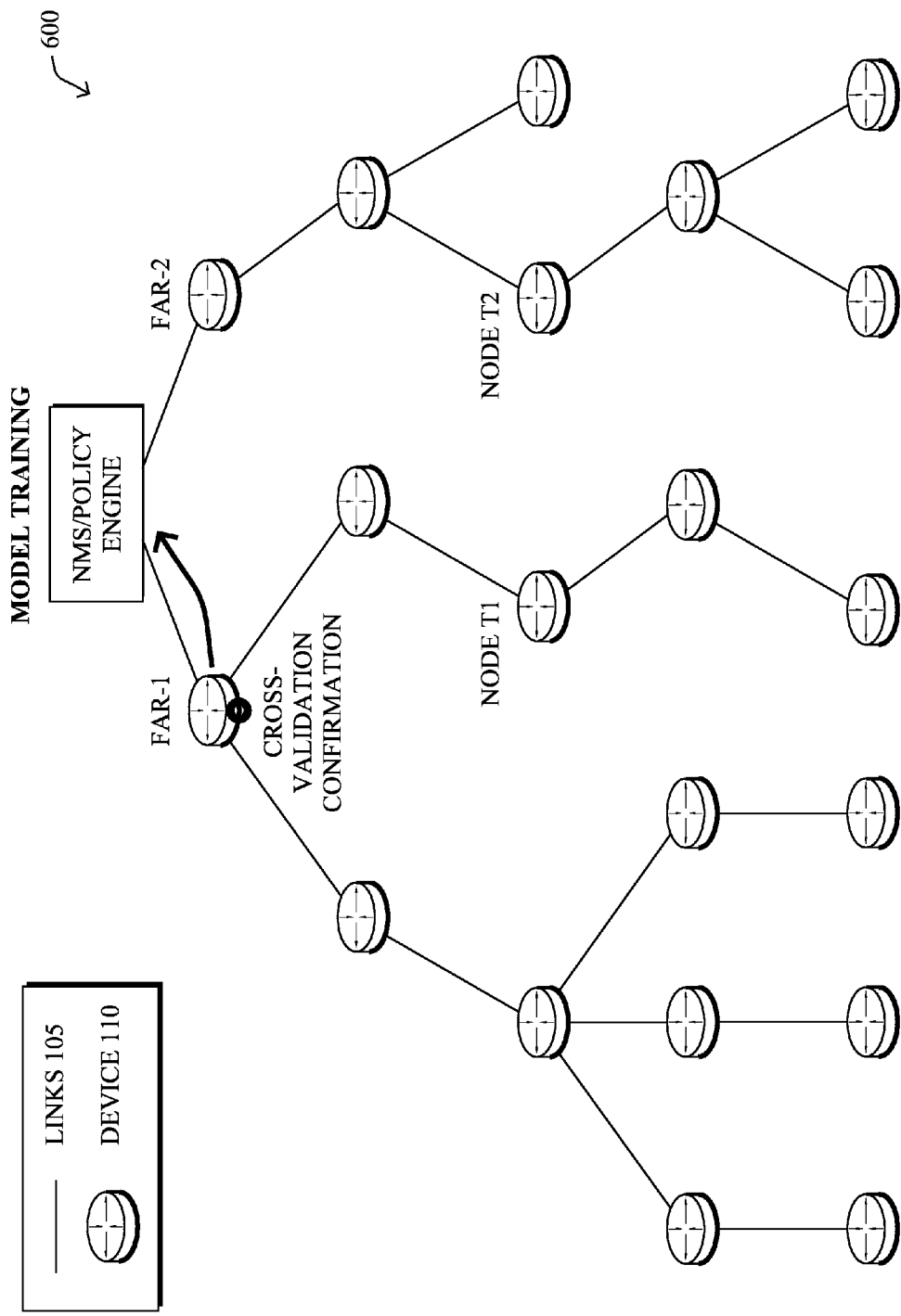
Figure 6I:
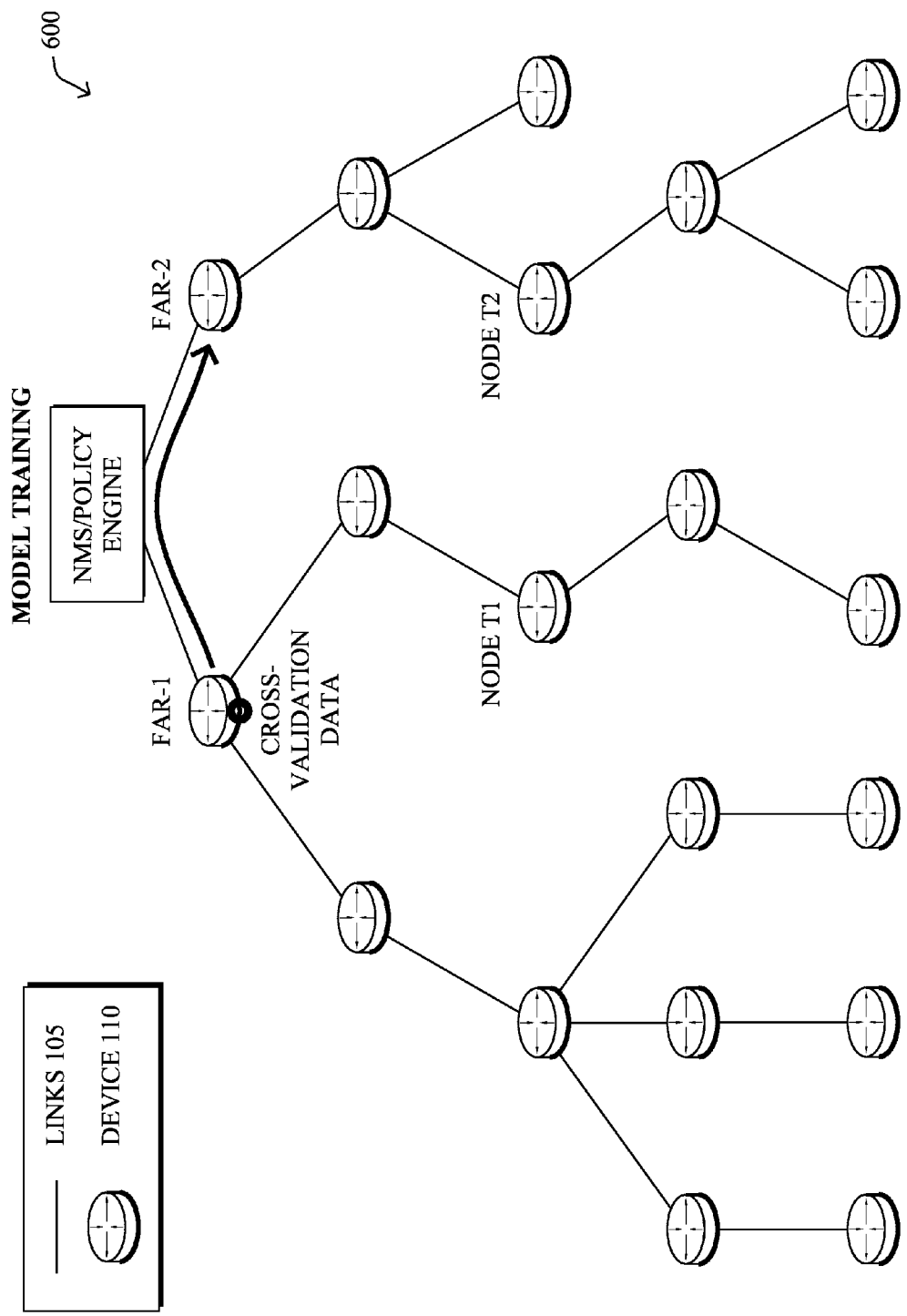
Figure 6J:
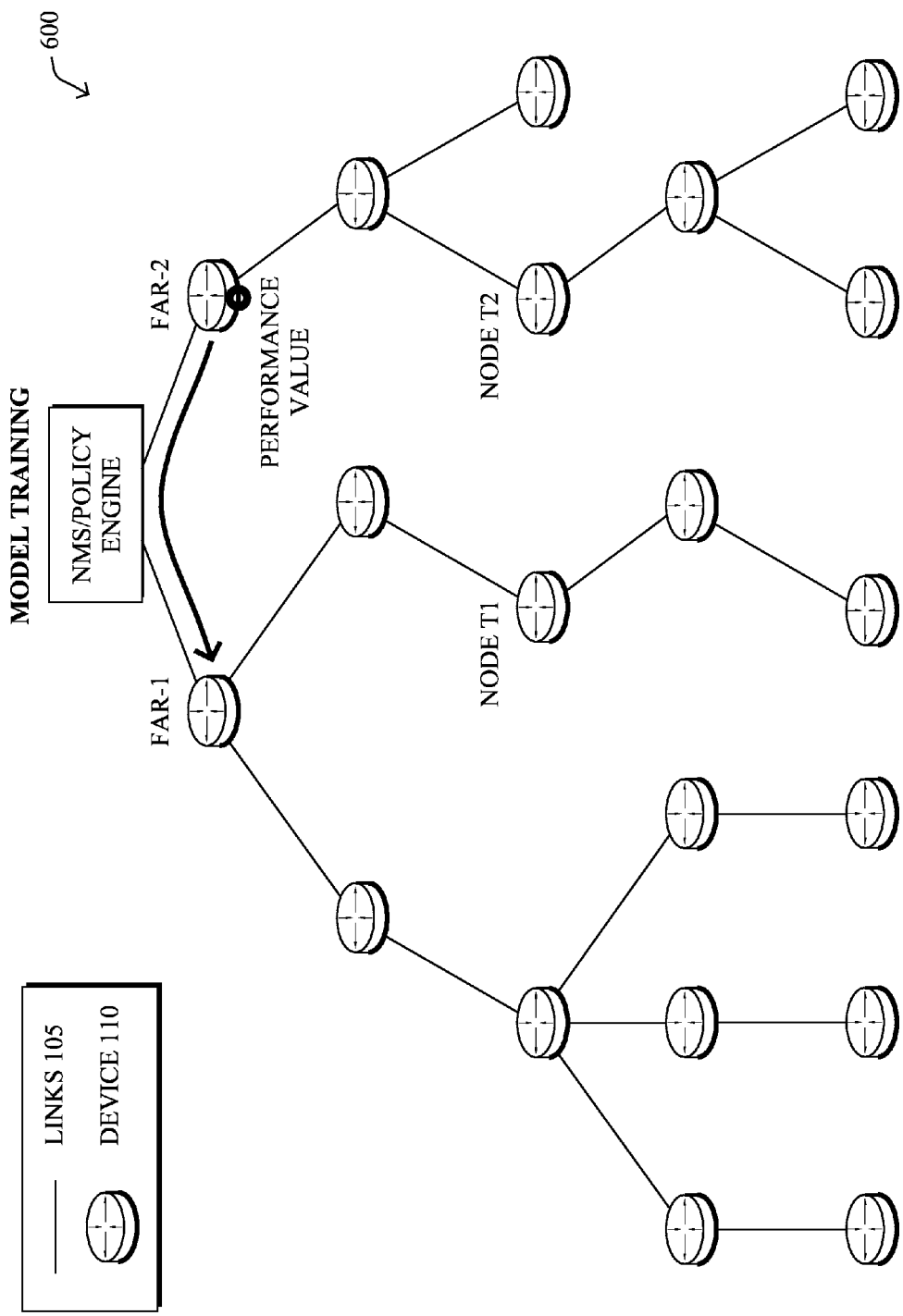
Figure 6K:
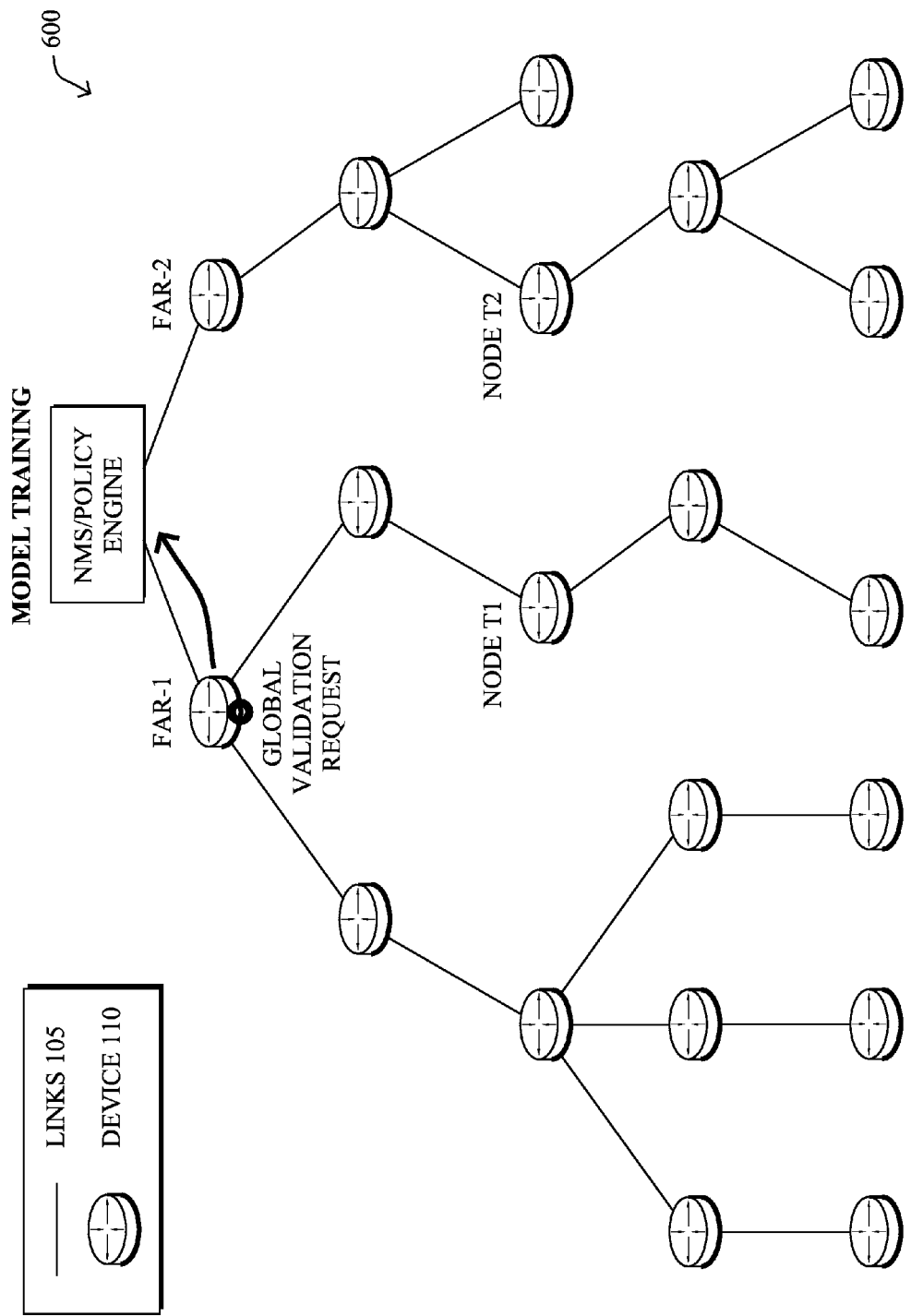
Figure 6L:
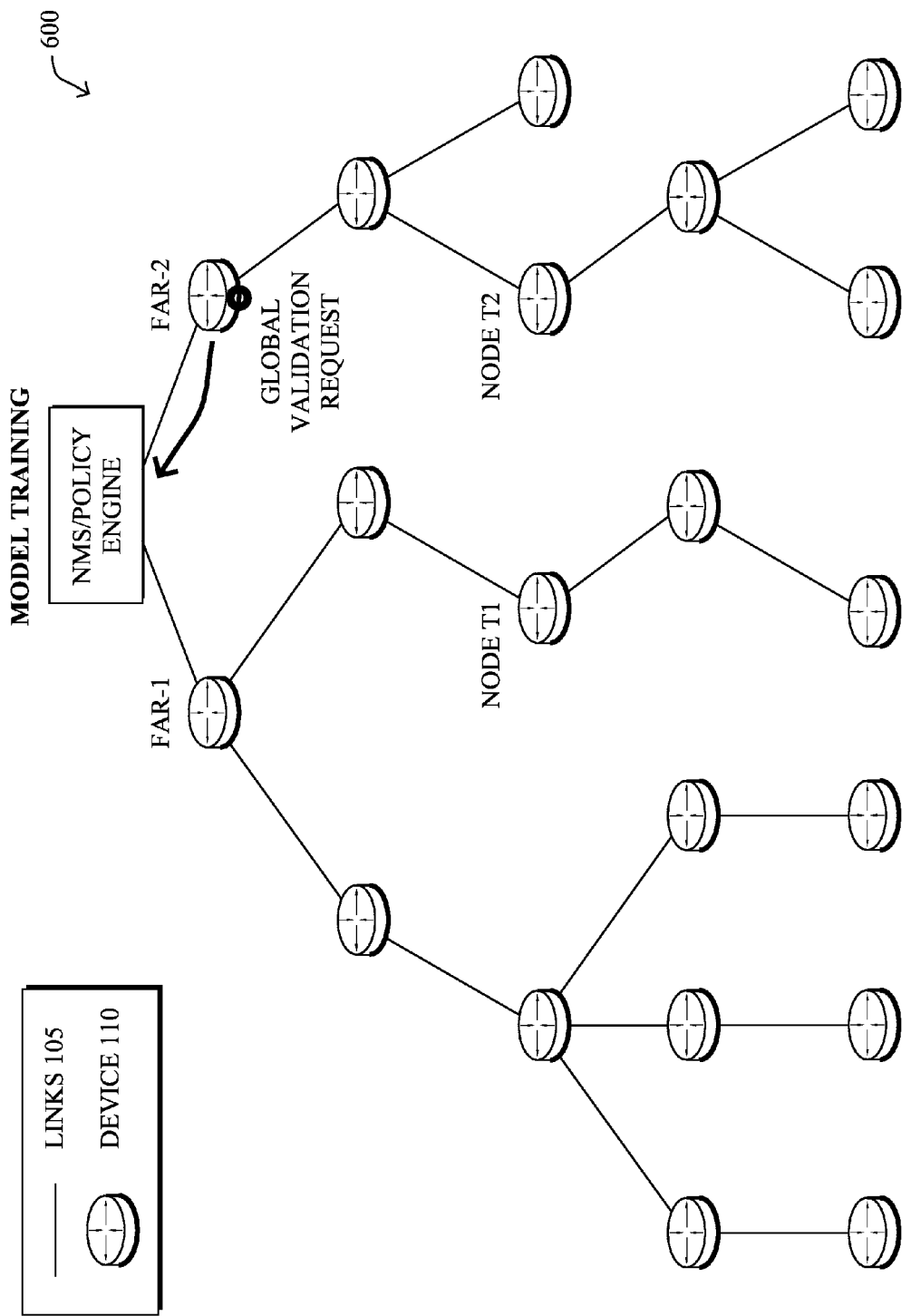
Figure 6M:
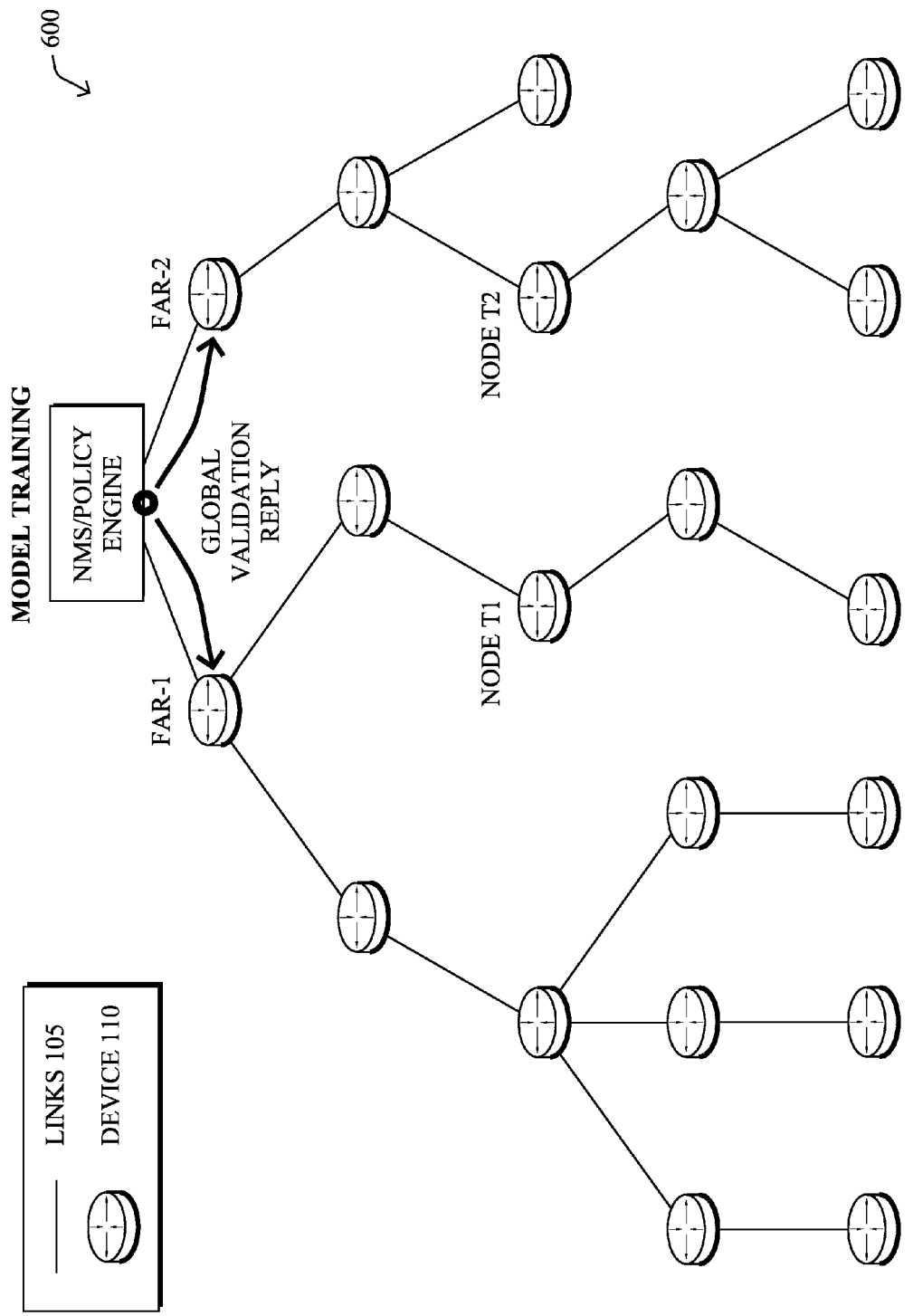
Figure 6N:
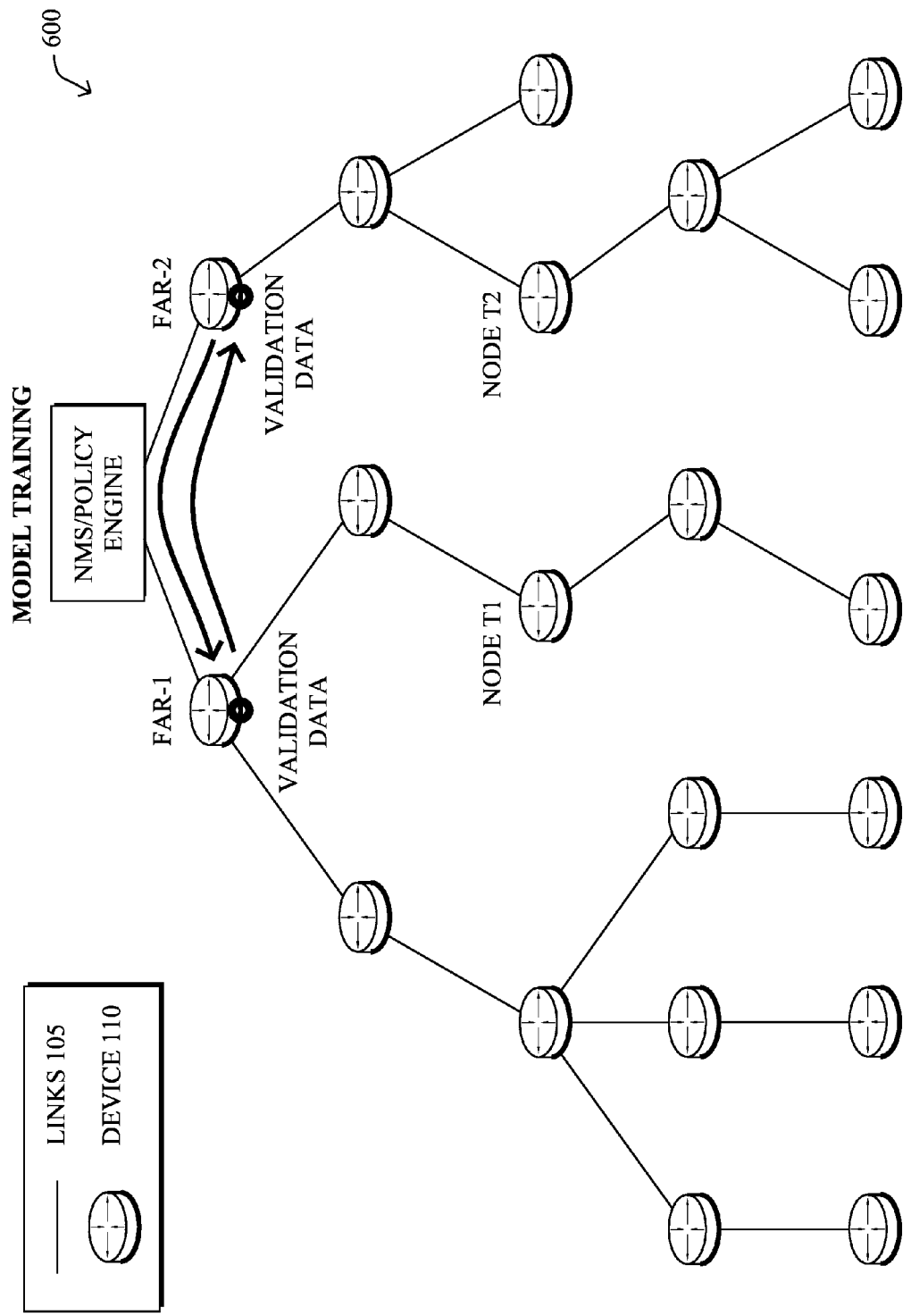
Figure 60:
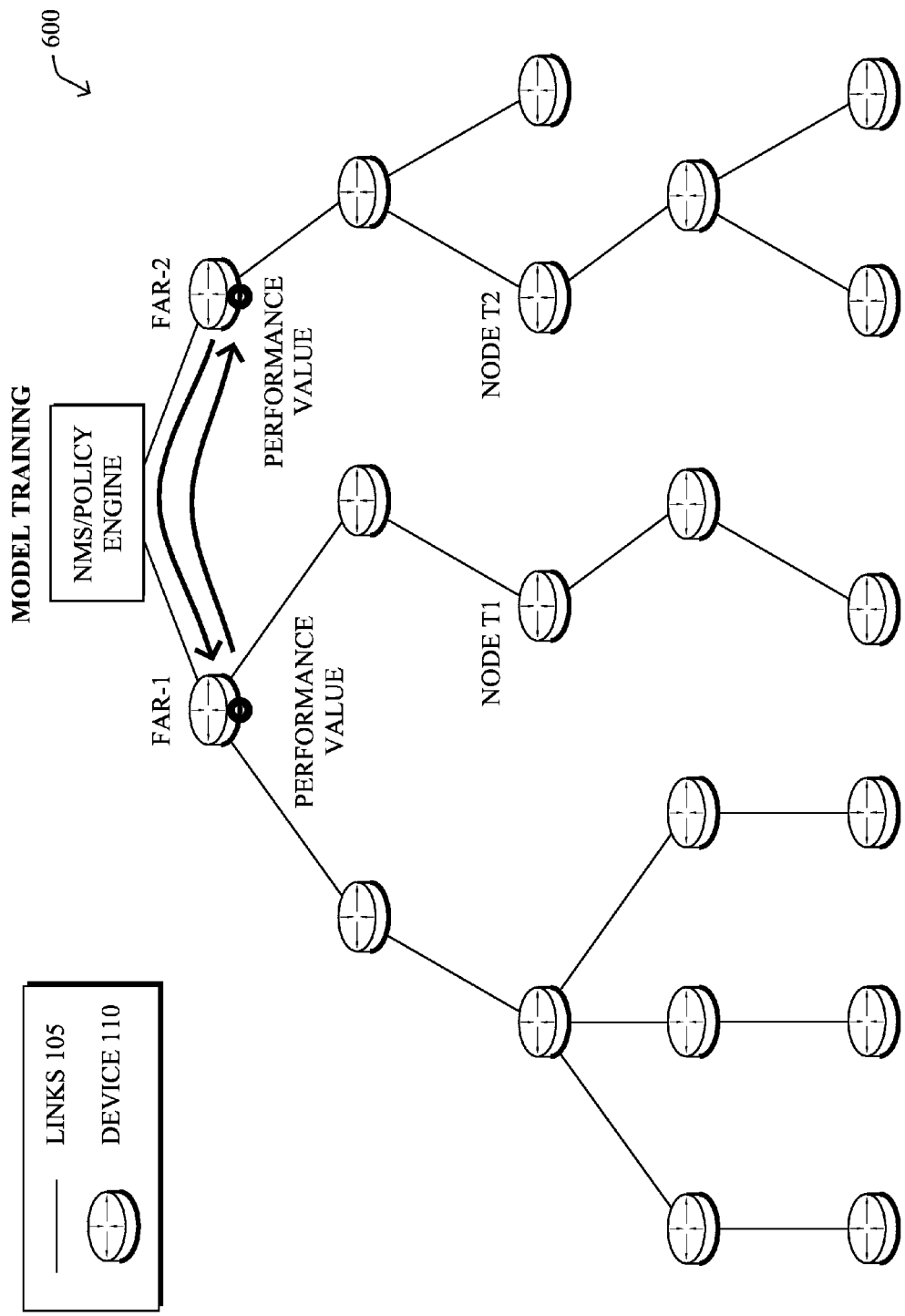
Figure 6P:
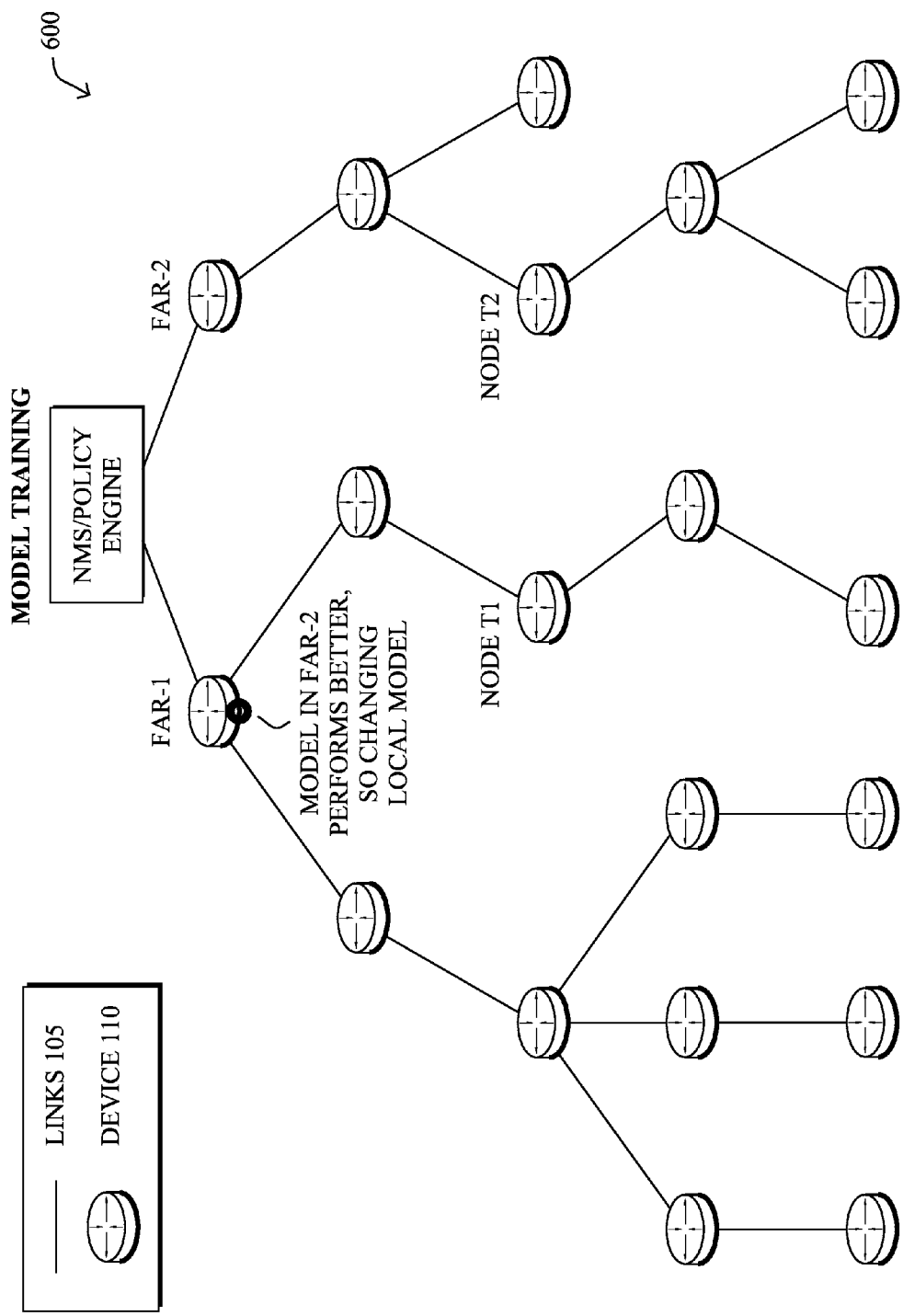

The third part of the illustrative architecture, with general reference to FIGS. 6A-6P, defines a method for training machine learning models (e.g., ANNs) by using the data collected using the elements described and referenced in the first and the second parts noted above.

Before starting the training phase, the FAR agent may again request permission from the NMS/policy engine, in one embodiment. This may be needed since training may require a relevant portion of the FAR's computational resources, which may not be compatible with some particular activities.

Similar to the first component discussed above, the FAR may send a CoAP message called a Training_Req message to the policy engine. For example, as shown in FIGS. 6B and 6D, FAR-1 and FAR-2 may each send a training request to the NMS/policy engine, respectively. The Traning_Req message may include any or all of the following TLVs:
1.) The ID of the FAR
2.) A type of attack
3.) An estimated duration
4.) An estimated resource occupation The policy engine, in turn, may respond with a newly defined unicast CoAP message called Training_Resp, which may either be positive or negative, in which case the FAR may be asked to postpone or change the duration of the LM training. For example, as shown in FIGS. 6C and 6E, the NMS/policy engine may send training responses to FAR-1 and FAR-2, respectively.

Training of the learning machine may be accomplished in any number of ways. In some cases, it may be possible to use off-the-shelf techniques for ANN training. However, training an ANN classifier in isolation with the data collected by the FAR itself may lead to classifiers trained on datasets that do not contain some significant phenomena, simply because during the data collection, this FAR has not observed it. Furthermore, special care has to be taken in order to avoid "overfitting," which can reduce the amount of data that can be used for training (since some data has to be removed from the training set and stored in a validation set).

According to various embodiments, more complex solutions may be used for model training, such as leveraging LM cross-validation among a set of different FARs. For example, as shown in FIGS. 6F-6J, FAR-1 may request that its trained model parameters be validated by another FAR, such as FAR-2, by requesting that FAR-2 apply the model parameters to the local data set at FAR-2. FAR-1 may then cross-validate the model by comparing local performance metrics for the model to the model's performance metrics generated and sent by FAR-2. This solution, while solving the overfitting problem, does not protect from important phenomena not contained in the training set. In another embodiment, a set of FARs may cross-evaluate their trained models and choose the most generalizable one according to all the datasets collected by all the FARs. This may be performed either via a distributed mechanism (e.g., each FAR sends its classifier to each other) or via a centralized mechanism (e.g., each FAR sends its classifier to the NMS). For example, as shown in FIGS. 6K-6P, the performance of each FAR's model may be evaluated using the data sets of the other FARs and the best performing model selected as a global model.

—Part-4: Attack Detection Using ANN Classifiers—

Figure 7A:
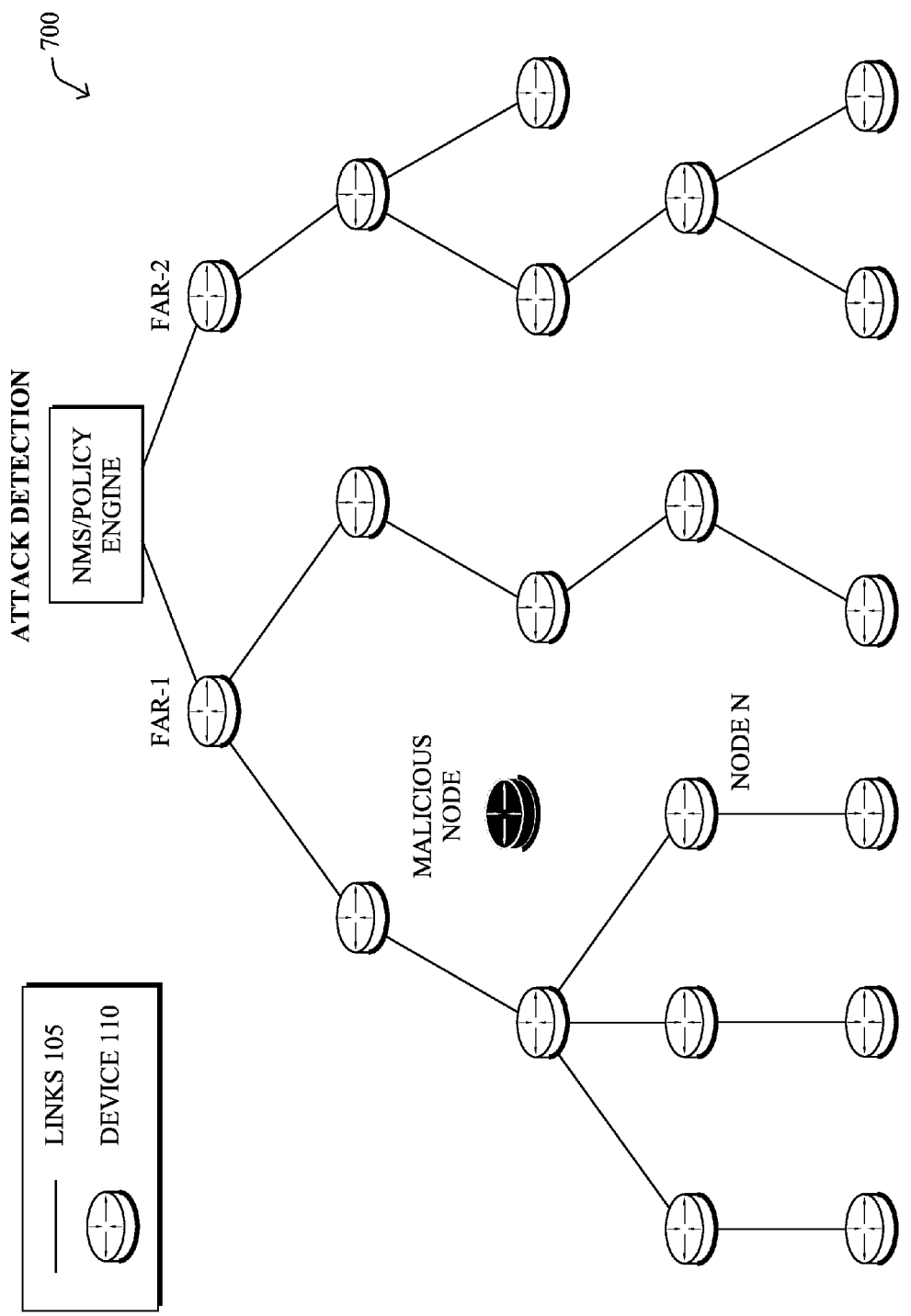
FIGS. 7A-7E illustrate example techniques for using a trained machine learning model to detect a network attack.
Figure 7B:
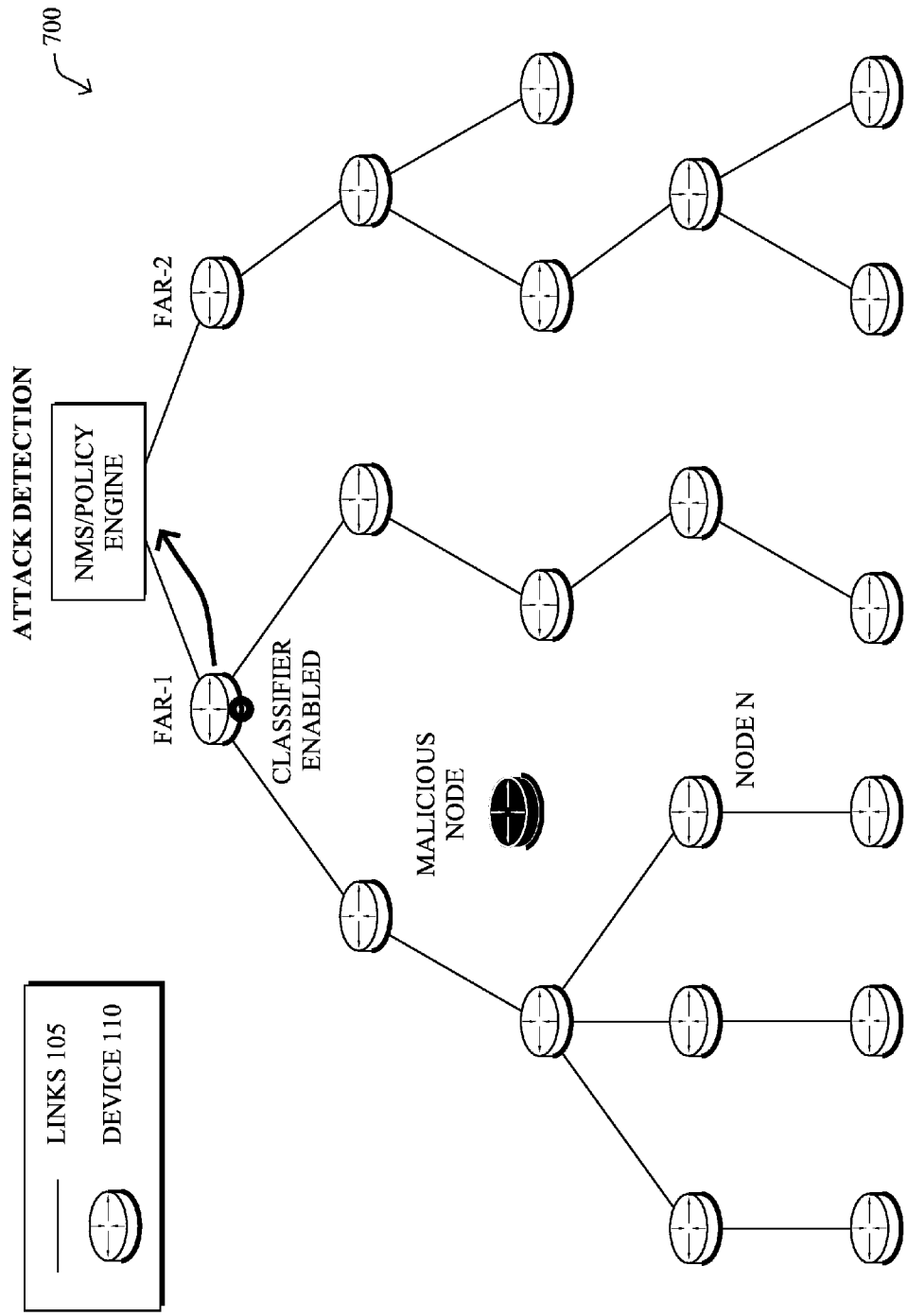
Figure 7C:
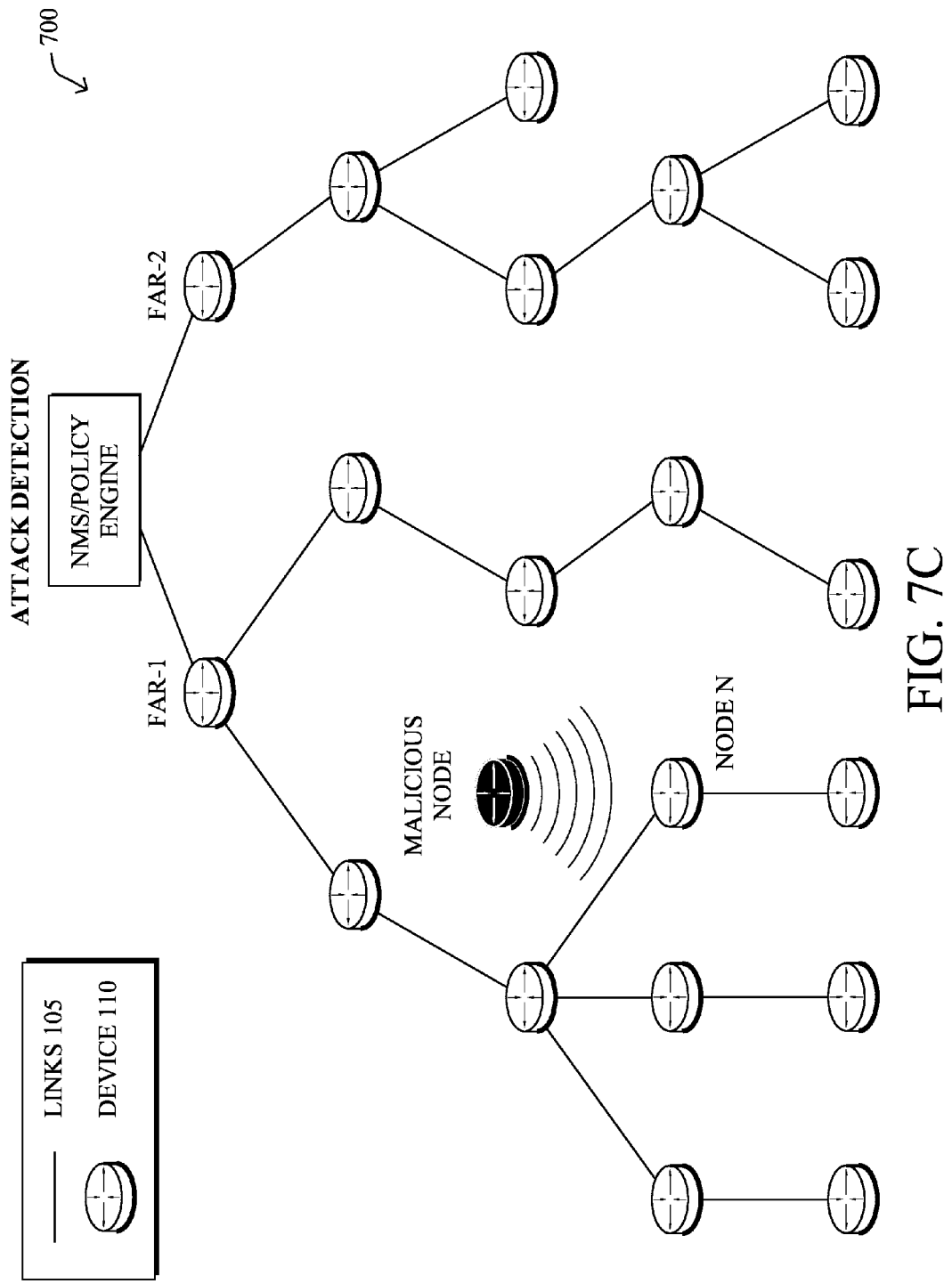

The last component of the illustrative architecture, with reference generally to FIGS. 7A-7E, is the actual method for attack detection. Whenever training has been carried out and the new ANN classifier or other model has been installed, the FAR agent may send to the policy engine a new CoAP message called a Classifier_Enabled message, to inform the NMS/policy engine that a classifier has been enabled. For example, as shown in FIG. 7B, FAR-1 may notify the NMS/Policy engine that its classifier has been enabled. Such a message may also include the computed classifier, in one embodiment, which can be used by the policy engine to double check data from another FAR in case of attack detection. Indeed, if the NMS received attack detection notification from FAR connected to the same PAN, this reinforces the probability that a real attack took place. This information can also be used in a centralized mode of cross-evaluation, as described above.

In one embodiment, the classifier continuously monitors a set of N features, which may be gathered through different means. These features may include, for example, any or all of the following:
  M features that are directly available to the FAR agent (i.e., they can be retrieved by simply querying the internal FAR state). An example is a node's rank in the logical topology.
  K features that can be gathered on the FAR directly, but need additional computations (e.g., the end-to-end packet loss that can be obtained by monitoring the application traffic flowing through the FAR).

R features that are only visible to the end nodes and need to be explicitly sent to the FAR agent. All of the information about link-layer statistics falls within this category (e.g., per-link losses, layer-2 neighbors, and density).

Figure 7D:
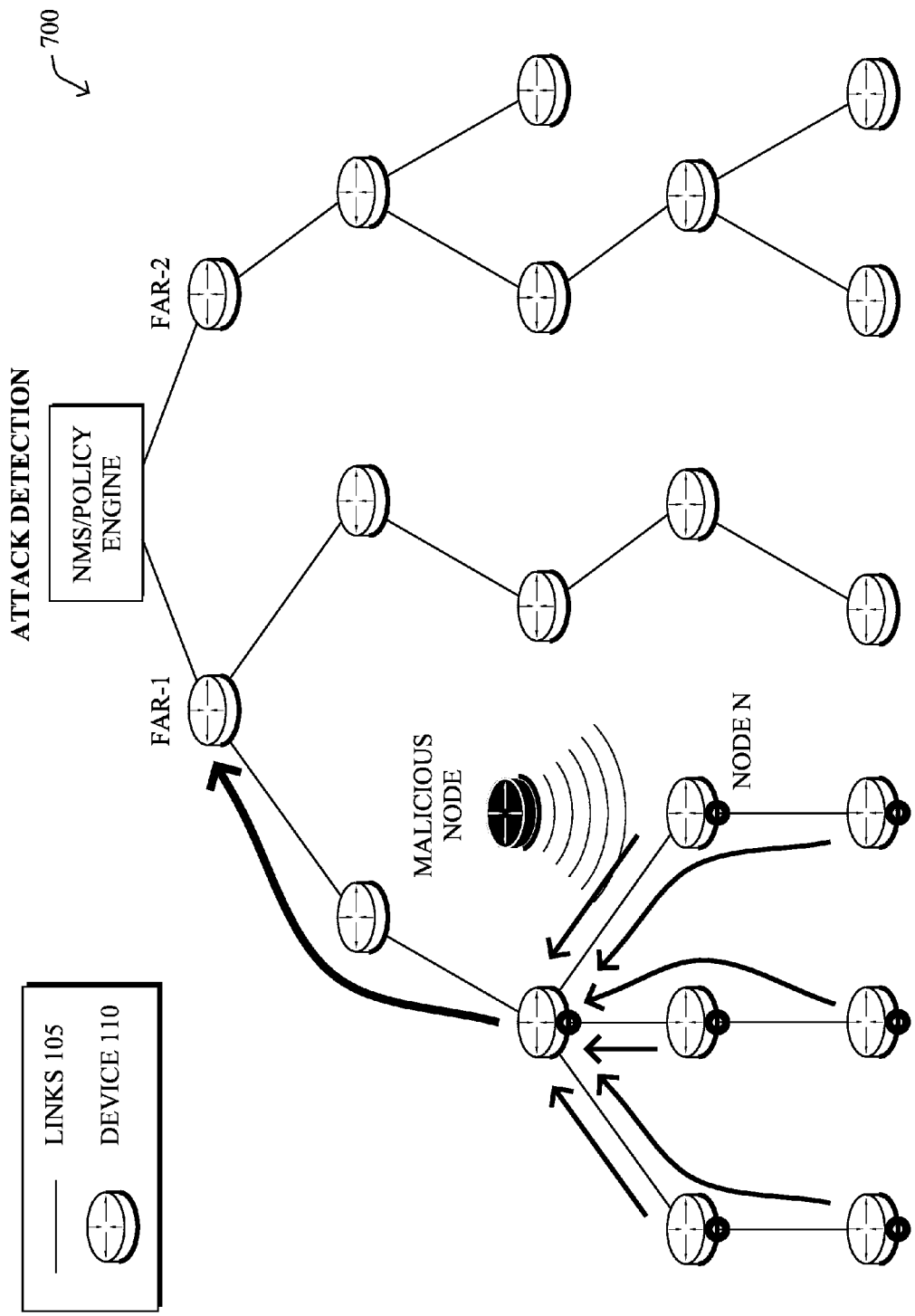

In the most simplistic implementation, nodes periodically send their R features to the FAR agent. For example, as shown in FIG. 7D, features from nodes affected by an attacker may be provided to FAR-1 for evaluation by the model executed by FAR-1. However, this could potentially produce a large amount of traffic, which can be reduced by performing aggregation. More sophisticated approaches that make use of hierarchical classification techniques can also be adopted. For example, one such solution envisions a first-stage classifier on the end nodes that takes as input the R local features only. In case such a classifier detects an attack, those R features are sent to the second stage classifier on the FAR or other nodes for more reliable classification. In any case, a closed loop aggregation control mechanism can be used to dynamically aggregate the feature values sent by the nodes.

Figure 7E:
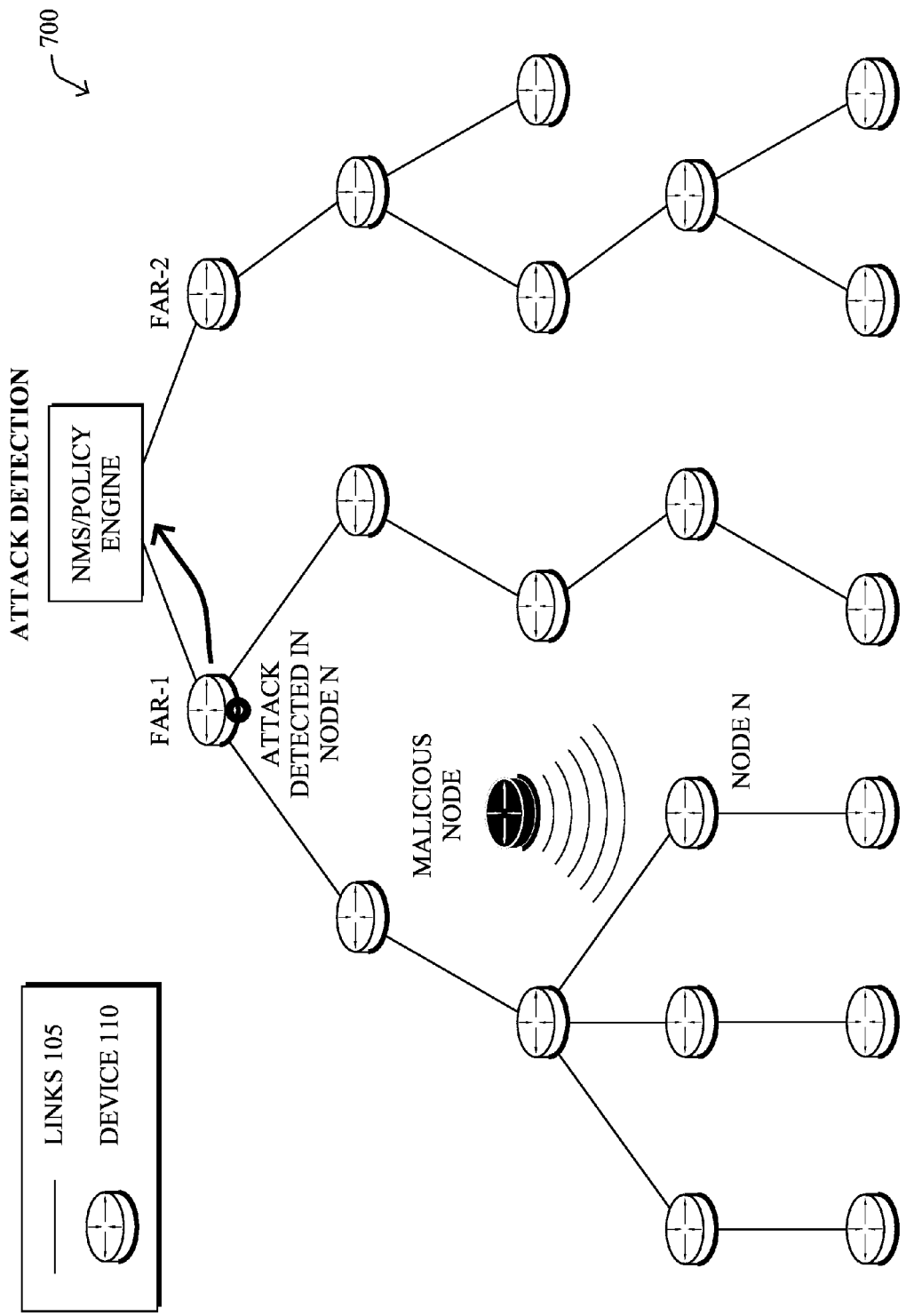

When an attack is detected (i.e., the classifier in the FAR labels a feature vector as belonging to the attack class), the FAR may send to the NMS a new CoAP message, Attack_Detected, that can include FAR-ID, the attack signature, and/or the set of features involved in the attack. For example, as shown in FIG. 7E, FAR-1 may notify the NMS/policy engine of the attack detected via the machine learning model. At this point, the NMS can take additional measures, such as notifying the network administrator of the detected attack.

In one embodiment, the NMS will try to confirm the detection of an attack by checking whether another FAR in the RF vicinity has detected the same attack. In other words, the NMS may determine which selected FAR(s) may have observed the same event. The NMS will send to the selected FAR the attack signature and set of features included in the Attack_Detected message that it received, to determine whether this detection is in fact a False Positive. Optionally, the NMS will send to those FARs the description of the classifier that detected the attack, so that they can apply it to their received data.

Figure 8:
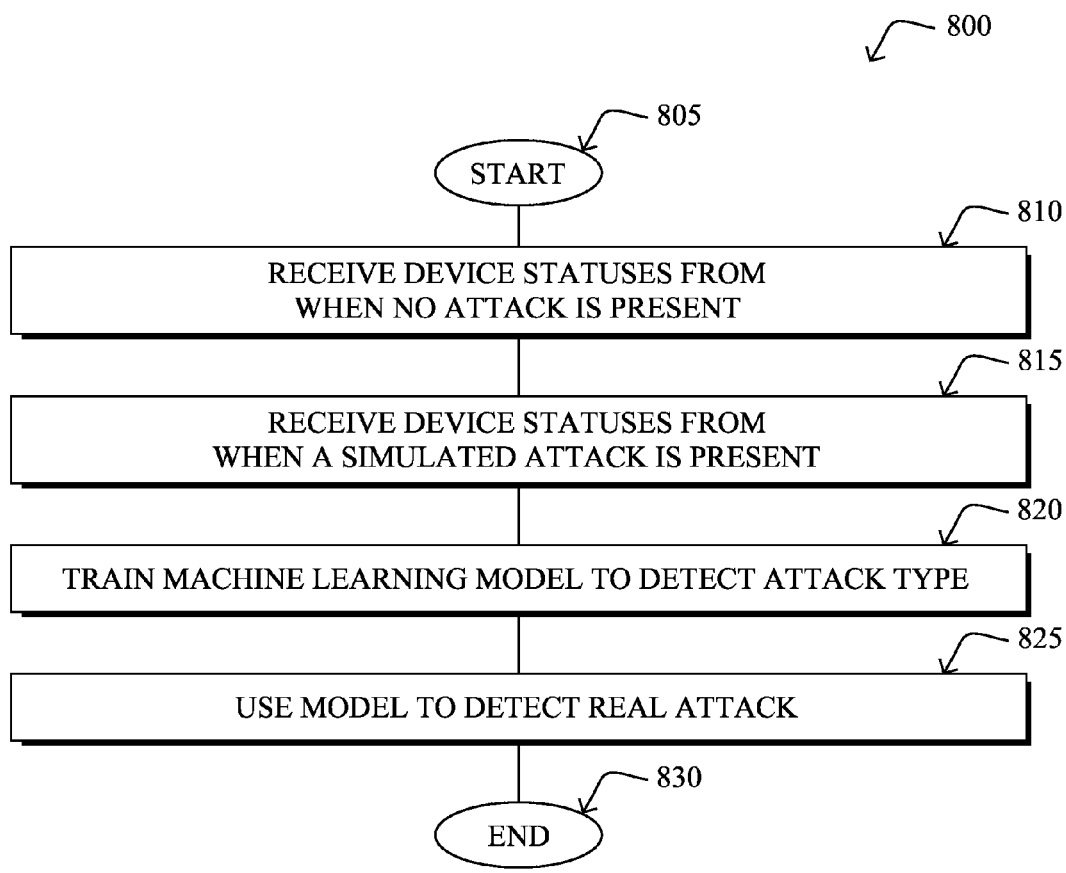
FIG. 8 illustrates an example simplified procedure for training a machine learning model using a simulated attack.

FIG. 8 illustrates a simplified procedure for training a machine learning model using a simulated attack from the perspective of a network node/device (e.g., a FAR or other device in the network). The procedure 800 starts at step 805 and continue on to step 810 where, as described in greater detail above, device statuses (i.e., feature data) are received from a time period during which no network attack is present. Such data may include any data representative of the operational state or states of the nodes. In step 815, device statuses/feature data are also received from a time period during which a simulated network attack is present. Procedure 800 then continues on to step 820 at which a machine learning model (e.g., an ANN, etc.) is trained to detect the type of simulated attack using the received data sets, as described in greater detail above. In step 825, the trained model is then used to detect a real network attack and procedure 800 ends at step 830.

Figure 9:
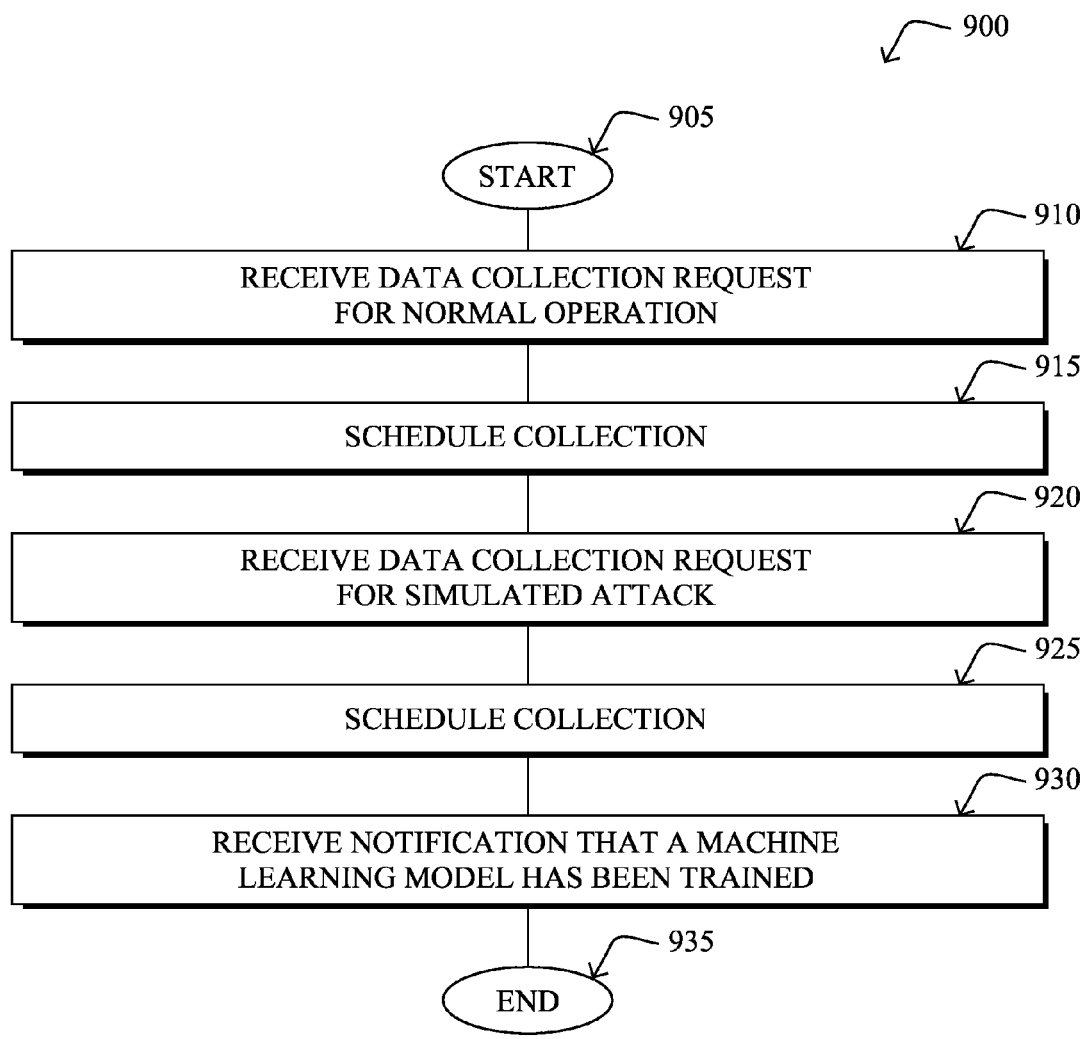
FIG. 9 illustrates an example simplified procedure for scheduling a simulated attack in a network.

FIG. 9 illustrates a simplified procedure for scheduling a simulated attack in a network (e.g., from the perspective of an NMS/policy engine). Procedure 900 begins at step 905 and continues on to step 910 where, as described in greater detail above, a data collection request is received to collect data during normal operation of the network. For example, a FAR may request permission from an NMS to begin collecting feature data from the nodes in its network. At step 915, the data collection is scheduled, according to the techniques described above. In step 920, a request is received to collect data for a simulated network attack and, at step 925, the collection/simulated attack is scheduled. For example, as described in greater detail above, an NMS/policy engine may receive a request from a FAR to initiate a simulated network attack and schedule the simulated attack and collection of the resulting data. In step 930, a notification is received that a machine learning model has been trained (e.g., using the data sets from when the simulated attack is not present and when the simulated attack is present) and procedure 900 ends at step 935.

It should be noted that while certain steps within procedures 800-900 may be optional as described above, the steps shown in FIGS. 8-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800-900 are described separately, certain steps from each procedure may be incorporated into each other procedure, and the procedures are not meant to be mutually exclusive.

The techniques described herein, therefore, provide an architecture for distributed and hierarchical learning network using machine learning models, such as ANNs. In particular, the techniques specify the overall architecture for the use of learning machine-based techniques, such as ANNs, to solve the complex problem of DoS attacks detection in constrained network, a critical issue for which no solution had been designed prior to this.

Illustratively, each of the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

While there have been shown and described illustrative embodiments that provide for computer network anomaly training and detection using artificial neural networks, generally, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    sending, by a network device, a request to a network policy engine to initiate collection of a first or a second data set from a plurality of network devices, the first data set indicative of the statuses of the plurality of network devices when a type of network attack is not present and the second data set indicative of the statuses of the plurality of network devices when the type of network attack is present;
    receiving, at the network device, an authorization from the network policy engine to begin collection of the first or second data set, the authorization based on an evaluation of an impact of collecting the first or second data sets on network traffic;
    in response to receiving the authorization from the network policy engine,
        receiving, at the network device, the first data set indicative of the statuses of the plurality of network devices when the type of network attack is not present;
        selecting, by the network device, at least one of the plurality of network devices to simulate the type of network attack by operating as an attacking node; and
        receiving, at the network device, the second data set indicative of the statuses of the plurality of network devices when the type of network attack is present based on the at least one of the plurality of network devices selected to simulate the type of network attack by operating as an attacking node;
    training a machine learning model using the first and second data set to identify the type of network attack; and
    identifying a real network attack using the trained machine learning model.

2. The method as in claim 1, wherein the machine learning model is an artificial neural network (ANN).

3. The method as in claim 1, further comprising:
    requesting the first or second data set from the plurality of network devices, in response to receiving the authorization to begin collection of the first or second data set.

4. The method as in claim 1, wherein the authorization comprises a scheduled start time for the collection of a simulated attack type, wherein the first or second data set is requested at the start time.

5. The method as in claim 1, wherein the request to initiate collection of the first or second data set comprises data selected from the group comprising: an estimated time duration for the data collection and an estimated size of the first or second data set.

6. The method as in claim 1, wherein the authorization comprises an instruction to reduce an estimated duration for the collection of the first or second data set.

7. The method as in claim 1, further comprising:
    sending an instruction to the at least one of the plurality of network devices to simulate the type of network attack.

8. The method as in claim 1, wherein the at least one of the plurality of network devices that simulates the type of network attack is selected randomly.

9. The method as in claim 1, further comprising:
    notifying the network policy engine that the machine learning model has been trained.

10. The method as in claim 1, further comprising:
    notifying a network policy engine of the network attack identified using the machine learning model.

11. An apparatus, comprising:
    one or more network interfaces to communicate in a computer network;
    a processor coupled to the network interfaces and configured to execute one or more processes; and
    a memory configured to store a process executable by the processor, the process when executed operable to:
        send a request to a network policy engine to initiate collection of a first or a second data set from a plurality of network devices, the first data set indicative of the statuses of the plurality of network devices when a type of network attack is not present and the second data set indicative of the statuses of the plurality of network devices when the type of network attack is present;
        receive an authorization from the network policy engine to begin collection of the first or second data set, the authorization based on an evaluation of an impact of collecting the first or second data set on network traffic;
        in response to receiving the authorization from the network policy engine,
            receive the first data set indicative of the statuses of the plurality of network devices when the type of network attack is not present;
            select at least one of the plurality of network devices to simulate the type of network attack by operating as an attacking node; and
            receive the second data set indicative of the statuses of the plurality of network devices when the type of network attack is present based on the at least one of the plurality of network devices selected to simulate the type of network attack by operating as an attacking node;
        train a machine learning model using the first and second data set to identify the type of network attack; and
        identify a real network attack using the trained machine learning model.

12. The apparatus as in claim 11, wherein the machine learning model is an artificial neural network (ANN).

13. The apparatus as in claim 11, wherein the process when executed is further operable to:
    send an instruction to the at least one of the plurality of network devices to simulate the type of network attack.

14. The apparatus as in claim 11, wherein the process when executed is further operable to:
    request the first or second data set from the plurality of network devices, in response to receiving the authorization to begin collection of the first or second data set.

15. The apparatus as in claim 11, wherein the authorization comprises a scheduled start time for the collection, and wherein the first or second data set is requested at the start time.

16. A tangible, non-transitory, computer-readable media having software encoded thereon, the software when executed by a processor operable to:
- send a request to a network policy engine to initiate collection of a first or a second data set from a plurality of network devices, the first data set indicative of the statuses of the plurality of network devices when a type of network attack is not present and the second data set indicative of the statuses of the plurality of network devices when the type of network attack is present;
- receive an authorization from the network policy engine to begin collection of the first or second data set, the authorization based on an evaluation of an impact of collecting the first or second data sets on network traffic;
- in response to receiving the authorization from the network policy engine,
- receive the first data set indicative of the statuses of the plurality of network devices when the type of network attack is not present;
- select at least one of the plurality of network devices to simulate the type of network attack by operating as an attacking node;
- receive the second data set indicative of the statuses of the plurality of network devices when the type of network attack is present based on the at least one of the plurality of network devices selected to simulate the type of network attack by operating as an attacking node;
- train a machine learning model using the first and second data set to identify the type of network attack; and
- identify a real network attack using the trained machine learning model.

17. The computer-readable media as in claim 16, wherein the machine learning model is an artificial neural network (ANN).

* * * * *